(12) United States Patent
Sugita et al.

(10) Patent No.: US 9,318,942 B2
(45) Date of Patent: Apr. 19, 2016

(54) ELECTRIC MACHINE WITH LINEAR MOVER

(75) Inventors: Satoshi Sugita, Nagano (JP); Yuqi Tang, Nagano (JP); Yasushi Misawa, Nagano (JP)

(73) Assignee: SANYO DENKI CO., LTD., Tokyo (JP)

( * ) Notice: Subject to any disclaimer, the term of this patent is extended or adjusted under 35 U.S.C. 154(b) by 569 days.

(21) Appl. No.: 13/599,509

(22) Filed: Aug. 30, 2012

(65) Prior Publication Data

US 2013/0057085 A1 Mar. 7, 2013

(30) Foreign Application Priority Data

Sep. 5, 2011 (JP) ................................ 2011-192980

(51) Int. Cl.
| | |
|---|---|
| H02K 41/03 | (2006.01) |
| H02K 1/14 | (2006.01) |
| H02K 1/27 | (2006.01) |
| H02K 7/08 | (2006.01) |
| H02K 16/00 | (2006.01) |

(52) U.S. Cl.
CPC ............. *H02K 41/031* (2013.01); *H02K 1/14* (2013.01); *H02K 1/2713* (2013.01); *H02K 7/083* (2013.01); *H02K 16/00* (2013.01); *H02K 2213/03* (2013.01)

(58) Field of Classification Search
CPC .............................. H02K 41/031; H02K 41/03

USPC .................................................. 335/222, 229
See application file for complete search history.

(56) References Cited

U.S. PATENT DOCUMENTS

| | | | | |
|---|---|---|---|---|
| 5,367,277 A | * | 11/1994 | Kaidou | 335/229 |
| 2007/0069591 A1 | * | 3/2007 | LeFlem | 310/12 |
| 2009/0289509 A1 | * | 11/2009 | Hoshi et al. | 310/12.33 |
| 2010/0171374 A1 | * | 7/2010 | Sugita et al. | 310/12.17 |
| 2011/0109173 A1 | * | 5/2011 | Sugita et al. | 310/12.18 |

FOREIGN PATENT DOCUMENTS

WO 2009/028369 A1 3/2009

* cited by examiner

*Primary Examiner* — Thomas Truong
(74) *Attorney, Agent, or Firm* — Rankin, Hill & Clark LLP

(57) ABSTRACT

An electric machine that allows enhancement of thrust of a mover is provided. An electric machine includes a magnetic pole piece array including a plurality of magnetic pole pieces spaced along a permanent magnet array. The magnetic pole pieces are disposed between the permanent magnet array and winding portions in immovable relation with the winding portions. The pitch of permanent magnets and the pitch of magnetic pole pieces are determined such that magnetic flux flows through two of the permanent magnets magnetized in the same direction and located in the permanent magnet array with one permanent magnet interposed between the two permanent magnets, and also flows through one of the magnetic pole pieces facing the one permanent magnet interposed between the two permanent magnets and magnetized in a direction of magnetization different from the direction of magnetization of the two permanent magnets.

25 Claims, 29 Drawing Sheets

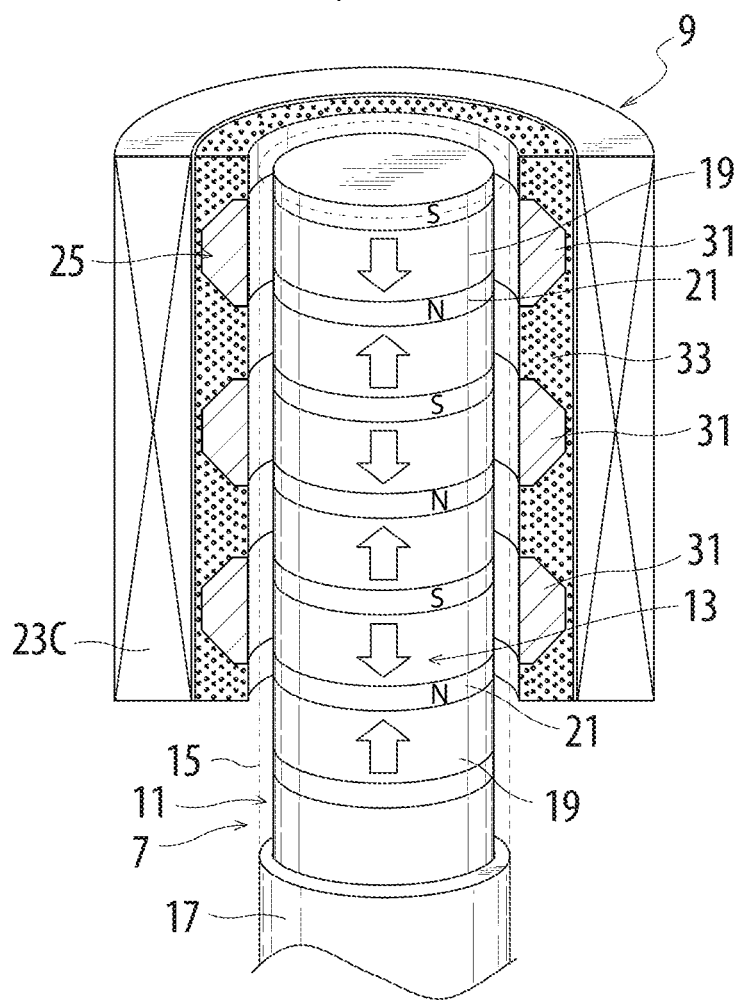

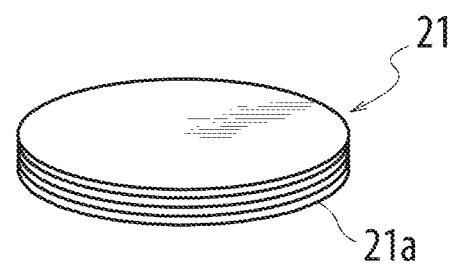
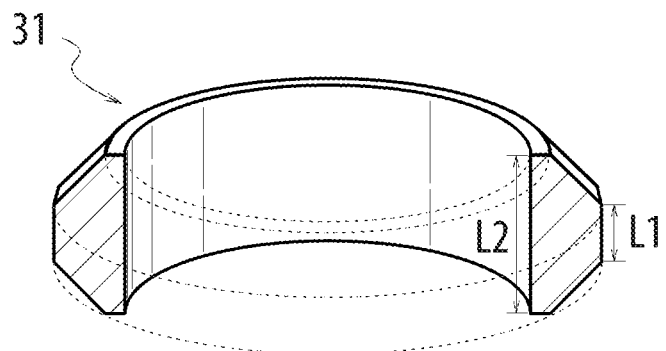

ELECTRIC MACHINE WITH LINEAR MOVER

TECHNICAL FIELD

The present invention relates to an electric machine including a linear motor, a linear vibration actuator, and a linear vibration generator.

BACKGROUND ART

WO 2009/028369 discloses an electric machine formed as a linear motor including a stator and a mover capable of reciprocal linear motion with respect to the stator. The mover of the linear motor includes a permanent magnet array including a plurality of permanent magnets arranged such that magnetic poles having the same polarity face each other. The stator of the linear motor includes winding portions formed by winding a winding conductor in a coil and concentrically disposed with the permanent magnet array. For the electric machine formed as this type of linear motor, it is desired to enhance thrust of the mover per unit volume. Thus, it is conceived to increase the number of winding portions, and to increase the size of the winding portions.

SUMMARY OF THE INVENTION

However, increasing the number of winding portions complicates manufacture, and increases the manufacturing cost. Meanwhile, increasing the size of the winding portions reduces thrust per unit volume of the linear motor.

An object of the present invention is to provide an electric machine that allows enhancement of thrust of a linear motor without increasing the number of winding portions or reducing thrust per unit volume.

Another object of the present invention is to provide an electric machine that allows a reduction in amount of permanent magnets and magnetic yokes without significantly reducing thrust of a mover.

Still another object of the present invention is to provide an electric machine inside which air piping for suctioning a chip using air can be formed if the electric machine is used for a chip mounter.

The present invention improves an electric machine including a stator and a mover capable of reciprocal linear motion with respect to the stator. In the present invention, one of the stator and the mover includes a permanent magnet array including a plurality of permanent magnets arranged such that magnetic poles having the same polarity face each other. The other of the stator and the mover includes one or more winding portions formed by winding a winding conductor in a coil and concentrically disposed with the permanent magnet array. The electric machine additionally includes a magnetic pole piece array including a plurality of magnetic pole pieces which are disposed between the permanent magnet array and the one or more winding portions in immovable relation with the winding portions and are spaced along the permanent magnet array. The pitch of the plurality of permanent magnets and the pitch of the plurality of magnetic pole pieces are determined such that magnetic flux flows through two of the permanent magnets magnetized in the same direction and located in the permanent magnet array with one permanent magnet interposed between the two permanent magnets, and also flows through one of the magnetic pole pieces facing the one permanent magnet interposed between the two permanent magnets and magnetized in a direction different from the direction of magnetization of the two permanent magnets.

In the electric machine which may be any of a linear motor, a linear vibration actuator, and a linear vibration generator and which includes the permanent magnet array and the magnetic pole piece array having the plurality of magnetic pole pieces configured according to the present invention, when magnetic flux flows through two of the permanent magnets magnetized in the same direction and located in the permanent magnet array with one permanent magnet interposed between the two permanent magnets, and also flows through one of the magnetic pole pieces facing the one permanent magnet interposed between the two permanent magnets and magnetized in a direction different from the direction of magnetization of the two permanent magnets, an attracting force is generated between respective magnetic poles formed in the plurality of magnetic pole pieces in the magnetic pole piece array and magnetic poles formed by permanent magnets adjacent to the magnetic pole pieces, allowing enhancement of thrust of the mover. In addition, electric power induced in the windings can be enhanced. Therefore, it is possible to enhance thrust of the mover of the electric machine without reducing thrust per unit volume as in the related art.

The plurality of magnetic pole pieces may each have an annular shape extending in a circumferential direction of the permanent magnet array to surround the permanent magnet array. This makes it possible to efficiently enhance flow of magnetic flux if the permanent magnet array includes a plurality of permanent magnets arranged such that magnetic poles having the same polarity face each other.

A magnetic yoke may be disposed on each of both sides of each of the plurality of permanent magnets. This makes it possible to efficiently enhance flow of magnetic flux, and to reduce a repulsive force generated when the permanent magnets of the same polarity are caused to face each other, facilitating manufacturing work.

The plurality of permanent magnets may each have a cylindrical shape having a hollow portion extending in an extending direction of the permanent magnet array, and the magnetic yokes may each have a through hole in communication with the hollow portions. This allows a reduction in amount of the permanent magnets and the magnetic yokes without significantly reducing thrust of the mover. In addition, the hollow portions of the permanent magnets and the through holes of the magnetic yokes can form a passage inside the permanent magnet array. Therefore, the passage can be utilized as air piping for suctioning a chip if the electric machine according to the present invention is used as a chip mounter.

The plurality of permanent magnets may be directly joined to each other to form the permanent magnet array. This allows an increase in amount of the permanent magnets and further enhancement of thrust of the mover of the electric machine.

Also in such a case, the plurality of permanent magnets may each have a cylindrical shape having a hollow portion extending in an extending direction of the permanent magnet array. This allows a reduction in amount of the permanent magnets used without significantly reducing thrust of the mover. In addition, the hollow portions of the permanent magnets can form a passage inside the permanent magnet array. Therefore, the passage can be utilized as air piping for suctioning a chip if the electric machine is used as a chip mounter.

The plurality of permanent magnets of the permanent magnet array may be housed inside a cylindrical member made of a non-magnetic material. This allows the permanent magnets to be easily disposed just by housing the permanent magnets inside the cylindrical member.

If the electric machine is a linear vibration actuator, the one or more winding portions generate alternating magnetic flux to provide thrust to cause the mover to repeat the reciprocal linear motion between the permanent magnets and the magnetic pole pieces.

If the electric machine is a linear vibration generator, when reciprocal linear motion of the mover is caused by an external force, magnetic flux flows through the plurality of permanent magnets of the permanent magnet array and the magnetic pole piece array to induce a voltage in the winding portions.

If the electric machine is a linear motor, the winding portions corresponding to n phases are disposed along the permanent magnet array, n being an integer of 2 or more, and excitation currents with a phase difference of $(360/n)°$ are supplied to the n winding portions to cause the reciprocal linear motion of the mover.

One of the following pairs of formulas is met: $\tau s=2\tau p(1+1/(n \cdot m))$ and $\tau sp=2\tau p(m+1/n)$; and $\tau s=2\tau p(1-1/(n \cdot m))$ and $\tau sp=2\tau p(m-1/n)$, where: $\tau p$ denotes the pitch of the plurality of permanent magnets; is denotes the pitch of the plurality of magnetic pole pieces located in a space inside one of the n winding portions; m denotes the number of the magnetic pole pieces located in the space inside the one of the n winding portions; and $\tau sp$ denotes an interphase pitch between two of the magnetic pole pieces, wherein one of the two magnetic pole pieces is contained in the m magnetic pole pieces located in the space inside one of adjacent two of the n winding portions and is located in the X-th position as viewed from one end to the other end in an extending direction of the permanent magnet array, and the other of the two magnetic pole pieces is contained in the m magnetic pole pieces located in the space inside the other of adjacent two of the n winding portions and is located in the X-th position as viewed from one end to the other end in the extending direction of the permanent magnet array.

Alternatively, the following pair of formulas may be met: $\tau s=2\tau p$ and $\tau sp=2\tau p(m\pm 1/n)$.

The electric machine may further include a back yoke provided outside the n winding portions to form a part of a magnetic circuit. This allows a magnetic circuit to be positively formed outside the plurality of winding portions, allowing enhancement of thrust of the mover.

The electric machine may further include a bearing fixed at each of both ends of the back yoke in the extending direction of the permanent magnet array to support the mover such that the mover is capable of the reciprocal linear motion but is not rotatable in the circumferential direction. This makes it possible to prevent the mover from rotating in the circumferential direction.

The plurality of magnetic pole pieces and the one or more winding portions may be molded with an insulating resin. This allows the plurality of magnetic pole pieces to be easily and reliably fixed to the winding portions.

The one or more winding portions may each be formed with a plurality of recessed portions opening toward the plurality of magnetic pole pieces, and the plurality of magnetic pole pieces may be partially inserted into the plurality of recessed portions, respectively. This allows a reduction in volume of the electric machine by an amount by which the plurality of magnetic pole pieces are partially inserted into the plurality of recessed portions, respectively.

The length, in an extending direction of the permanent magnet array, of a surface of each of the plurality of magnetic pole pieces facing the one or more winding portions may be shorter than the length, in the extending direction of the permanent magnet array, of a surface of each of the plurality of magnetic pole pieces facing the permanent magnets. This allows a reduction in leakage magnetic flux, allowing more efficient generation of thrust or electric power.

Alternatively, the length, in an extending direction of the permanent magnet array, of a surface of each of the plurality of magnetic pole pieces facing the one or more winding portions may be equal to the length, in the extending direction of the permanent magnet array, of a surface of each of the plurality of magnetic pole pieces facing the permanent magnets. This facilitates manufacture of the magnetic pole pieces, providing an inexpensive linear motor.

Each of the plurality of magnetic pole pieces may be formed by stacking magnetic steel sheets in an extending direction of the permanent magnet array. This allows the magnetic pole pieces to be formed using magnetic steel sheets formed by pressing.

Each of the plurality of magnetic pole pieces may be formed by winding a belt-like magnetic steel sheet in the circumferential direction. This allows the magnetic pole pieces to be formed using a belt-like magnetic steel sheet formed by pressing.

Each of the plurality of permanent magnets may each be magnetized such that a curved internal magnetic path is formed inside each of the plurality of permanent magnets, each curved internal magnetic path running from one end to the other end of an outer peripheral surface of the permanent magnet in an extending direction of the permanent magnet array. Use of such permanent magnets can provide a long internal magnetic path, preventing a reduction in magnetic force of the permanent magnets.

If the electric machine is a linear vibration actuator, one winding portion may be provided, and an alternating current may be supplied to the one winding portion to cause the mover to reciprocally vibrate. This facilitates formation of a linear vibration actuator having one winding portion.

Alternatively, two winding portions may be disposed side by side in an extending direction of the mover, and alternating currents having opposite phases may be supplied to the two winding portions to cause the mover to reciprocally vibrate, forming a linear vibration actuator. This allows formation of a linear vibration actuator having two winding portions to provide high thrust.

If the electric machine is a linear vibration generator, the permanent magnet array may be configured to reciprocally move by means of an external force such that an alternating voltage is induced in each of the one or more winding portions.

Meanwhile, two winding portions may be disposed side by side in an extending direction of the mover. In this case, a plurality of magnetic pole pieces located in one of the winding portions and a plurality of magnetic pole pieces located in the other of the winding portions may be disposed apart from each other by an electrical angle of 180°, and the permanent magnet array may be configured to reciprocally move by means of an external force such that an alternating voltage is induced in each of the two winding portions. This makes it possible to generate high alternating-current electric power using the two winding portions.

In a composite electric machine including a plurality of electric machines arranged side by side and each including a back yoke, the back yokes of the plurality of electric machines may be integrated to form an outer covering. This allows the plurality of electric machines to be bundled by the single, integrated back yoke.

The back yokes of the plurality of electric machines may be shaped such that no back yoke is provided between two adjacent electric machines. This allows a reduction in length of the composite electric machine in the arrangement direction of the plurality of electric machines. Although no back yoke is provided at some locations, thrust of the mover is not significantly affected.

The back yokes may each include a flat surface portion provided on an outer surface of the back yoke such that the outer surfaces of the back yokes of two adjacent electric machines are in surface contact with each other. This also allows a reduction in length of the composite electric machine in the arrangement direction of the plurality of electric machines.

BRIEF DESCRIPTION OF THE DRAWINGS

FIG. 2 is a partial enlarged view of FIG. 1.

FIG. 3 is a perspective view of a magnetic yoke used in the linear motor shown in FIG. 1.

FIG. 4 is a perspective view of a magnetic pole piece used in the linear motor shown in FIG. 1, shown partially in cross section.

DESCRIPTION OF THE PREFERRED EMBODIMENTS

Electric machines according to embodiments of the present invention will be described in detail below with reference to the drawings.

(First Embodiment)

Figure 1:
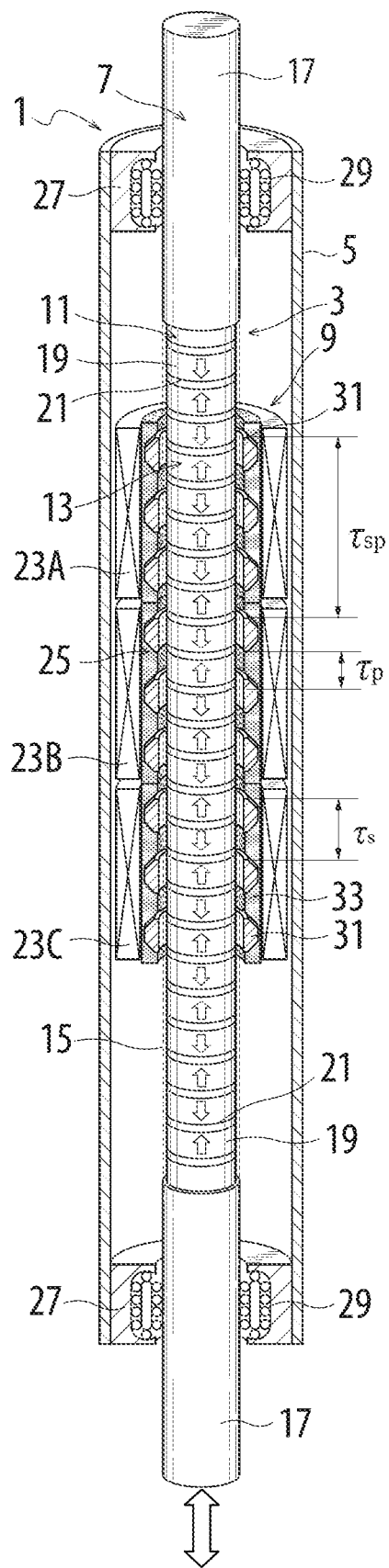
FIG. 1 is a perspective view showing an electric machine according to a first embodiment of the present invention applied to a linear motor, shown partially in cross section.

FIG. 1 is a perspective view showing an electric machine according to a first embodiment of the present invention applied to a linear motor, shown partially in cross section. In FIG. 1, in order to facilitate understanding, a stator 9 is shown in cross section, and a mover 7 is shown in plan (not in cross section). As shown in FIG. 1, a linear motor 1 according to the embodiment includes a linear motor assembly 3 and a back yoke 5 attached to the linear motor assembly 3. The linear motor assembly 3 includes the mover 7 and the stator 9. The mover 7 includes a linear motion shaft 11 and a permanent magnet array 13. As shown in the partially enlarged view of FIG. 2, the linear motion shaft 11 includes a linear motion shaft body 15 and a pair of linear motion shaft end members 17, and is capable of reciprocal linear motion in the extending direction (axial direction) of the permanent magnet array 13. In FIGS. 1 and 2, the linear motion shaft body 15 is depicted as transparent. The linear motion shaft body 15 is formed by a cylindrical pipe made of stainless steel which is a non-magnetic material. The permanent magnet array 13 is housed inside the linear motion shaft body 15. The permanent magnet array 13 includes a plurality of columnar permanent magnets 19 and magnetic yokes 21 disposed on both sides of each of the plurality of permanent magnets 19. The magnetic yokes 21 are made of a magnetic material such as iron, and each have a circular plate shape. In the embodiment, as shown in FIG. 3, the magnetic yokes 21 are each formed by stacking a plurality of magnetic steel sheets 21a made of silicon steel in the axial direction. Carbon steel, ferrite-based stainless steel, a pressed powder magnetic core, etc., may also be used as the material of the magnetic yokes 21. The plurality of permanent magnets 19 are arranged such that magnetic poles of two adjacent permanent magnets 19 having the same polarity face each other.

The pair of linear motion shaft end members 17 each have an elongated bar shape. The pair of linear motion shaft end members 17 are connected to both ends of the linear motion shaft body 15 in the axial direction, and supported by a pair of ball spline bearings 29 to be discussed later to be slidable in the thrust direction, respectively.

As shown in FIG. 1, the stator 9 includes winding portions 23A to 23C corresponding to n phases (n is an integer of 2 or more; in the embodiment, three phases), a magnetic pole piece array 25, a pair of end brackets 27, and the pair of ball spline bearings 29. The winding portions 23A to 23C are formed by winding a winding conductor in a coil, and concentrically disposed with the permanent magnet array 13. Excitation currents with a phase difference of 120°) ((360/n)° in terms of electrical angle are supplied to the winding portions 23A to 23C. As a result, currents for U phase, V phase, and W phase are supplied to the winding portions 23A to 23C, respectively.

Figure 5:
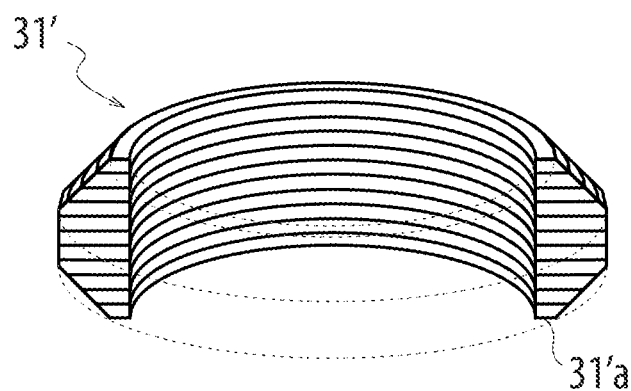
FIG. 5 is a perspective view showing an example of the magnetic pole piece, shown partially in cross section.
Figure 6:
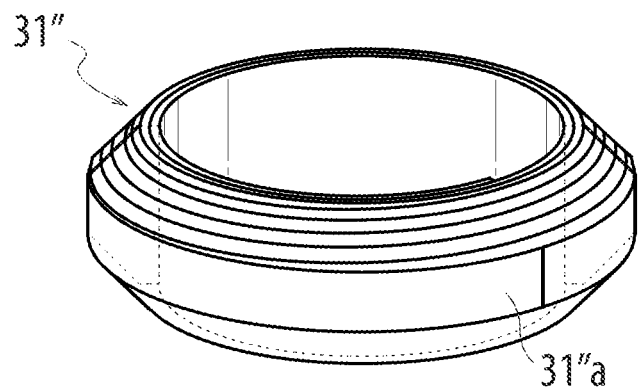
FIG. 6 is a perspective view showing another example of the magnetic pole piece, shown partially in cross section.
Figure 7:
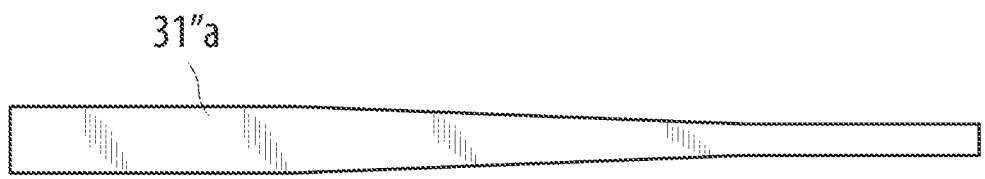
FIG. 7 is a plan view of a belt-like magnetic steel sheet used to form the magnetic pole piece shown in FIG. 6.

The magnetic pole piece array 25 includes a plurality of magnetic pole pieces 31 spaced along the permanent magnet array 13. As shown in FIG. 4, the magnetic pole pieces 31 are made of a magnetic material such as silicon steel, and each have an annular shape extending in the circumferential direction of the permanent magnet array 13 to surround the permanent magnet array 13. The magnetic pole pieces 31 are disposed between the permanent magnet array 13 and the winding portions 23A to 23C in immovable relation with the winding portions 23A to 23C. In the embodiment, three magnetic pole pieces 31 are located in a space inside one of the plurality of winding portions 23A to 23C. The magnetic pole pieces 31 may each be formed by stacking a plurality of magnetic steel sheets 31' a in the axial direction as with a magnetic pole piece 31' shown in FIG. 5, or by winding a belt-like magnetic steel sheet 31'' a (FIG. 7) as with a magnetic pole piece 31'' shown in FIG. 6. As shown in FIG. 4, the length L1, in the axial direction, of a surface of each of the magnetic pole pieces 31 facing the winding portions 23A to 23C is shorter than the length L2, in the axial direction, of a surface of each of the magnetic pole pieces 31 facing the permanent magnets 19. In the embodiment, as shown in FIG. 2, the plurality of magnetic pole pieces 31 and the winding portions 23A to 23C are molded with an insulating resin 33. The pitch $\tau p$ of the plurality of permanent magnets 19 and the pitch $\tau s$ of the plurality of magnetic pole pieces 31 shown in FIG. 1 are determined such that magnetic flux flows through two of the permanent magnets 19 magnetized in the same direction and located in the permanent magnet array 13 with one permanent magnet 19 interposed between the two permanent magnets 19 magnetized in the same direction, and also flows through one of the magnetic pole pieces 31 facing the one permanent magnet 19 interposed between the two permanent magnets 19 and magnetized in a direction of magnetization different from the direction of magnetization of the two permanent magnets 19. In the embodiment, the pitch $\tau p$ of the plurality of permanent magnets 19, the pitch is of the plurality of magnetic pole pieces 31 located in the space inside one of the three winding portions 23A to 23C, and the interphase pitch $\tau sp$ of the plurality of magnetic pole pieces 31 meet one of the following pairs of formulas: $\tau s=2\tau p(1+1/(n \cdot m))$ and $\tau sp=2\tau p(m+1/n)$; and $\tau s=2\tau p(1-1/(n \cdot m))$ and $\tau sp=2\tau p(m-1/n)$. In the formulas, m is the number (in the embodiment, three) of the magnetic pole pieces 31 located in the space inside one of the plurality of winding portions 23A to 23C, and n is the number (in the embodiment, three) of phases of the winding portions 23A to 23C. In addition, the interphase pitch $\tau sp$ of the plurality of magnetic pole pieces 31 is the distance between a magnetic pole piece 31 contained in the three magnetic pole pieces 31 located in the space inside one of adjacent two of the three winding portions 23A to 23C and located in the X-th position as viewed from one end to the other end in the axial direction (extending direction of the permanent magnet array 13), and a magnetic pole piece 31 contained in the three magnetic pole pieces 31 located in the space inside the other of the two winding portions and located in the X-th position as viewed from one end to the other end in the axial direction. For the linear motor according to the embodiment, m=3, n=3, and $\tau sp=2\tau p(m-1/n)$. Then, for the linear motor according to the embodiment, substituting such values into the formulas derives $\tau s=2\tau p(1-1/9)$ and $\tau sp=2\tau p(3-1/3)$, that is, $\tau s=16/9\tau p$ and $\tau sp=16/3\tau p$.

The pair of end brackets 27 are formed from a metal material such as aluminum or plastic having processability, and have a cylindrical shape. The pair of ball spline bearings 29 are fixed to the pair of end brackets 27, respectively, to support both ends of the linear motion shaft 11 of the mover 7 such that the mover 7 is capable of reciprocal linear motion in the thrust direction (axial direction) but is not rotatable in the circumferential direction.

Figure 8:
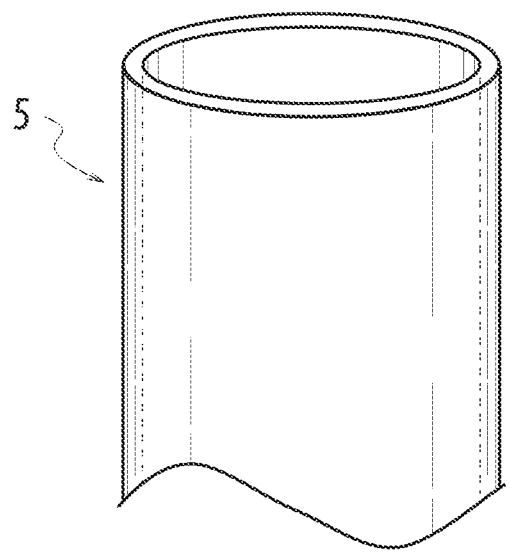
FIG. 8 is a partial perspective view of a back yoke used in the linear motor shown in FIG. 1.
Figure 9:
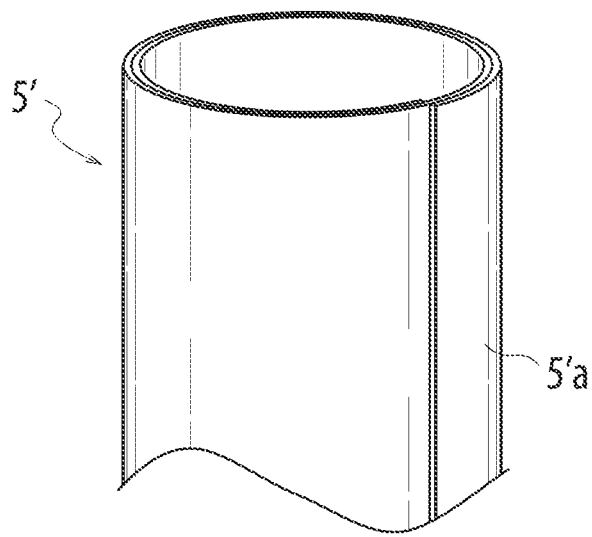
FIG. 9 is a partial perspective view of an example of the back yoke.

The back yoke 5 attached to the linear motor assembly 3 is provided outside the plurality of winding portions 23A to 23C to form a part of a magnetic circuit. As shown in FIG. 8, the back yoke 5 is formed by a seamless pipe made of a magnetic material such as a silicon steel sheet. The back yoke 5 may be formed by winding a magnetic steel sheet 5' a as with a back yoke 5' shown in FIG. 9. The pair of end brackets 27 are fitted at both ends of the back yoke 5.

Figure 10:
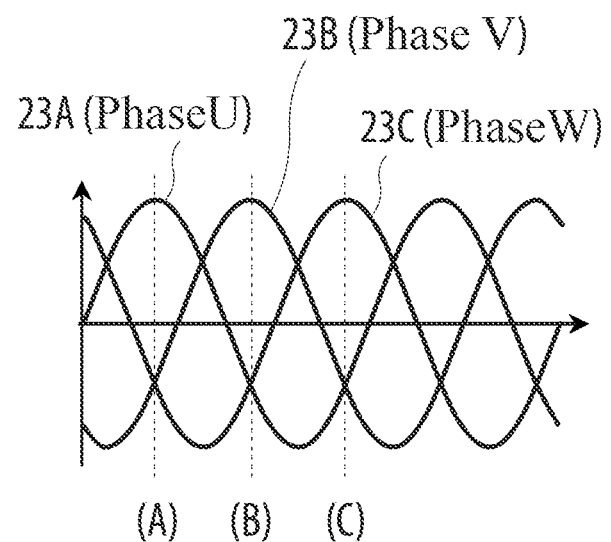
FIG. 10 shows waveforms of phases used to illustrate the principle based on which reciprocal linear motion of the linear motor shown in FIG. 1 is caused.
Figure 11A:
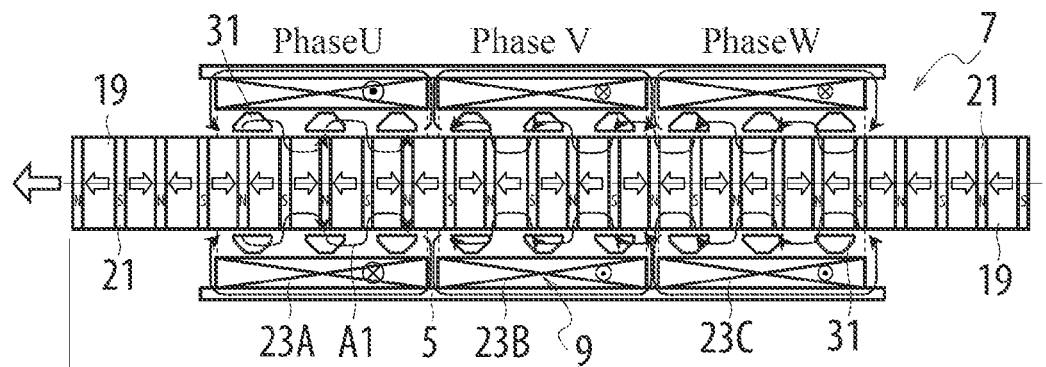
FIGS. 11A to 11C show the positional relationship between a mover and a stator used to illustrate the principle based on which reciprocal linear motion of the linear motor shown in FIG. 1 is caused.
Figure 11B:
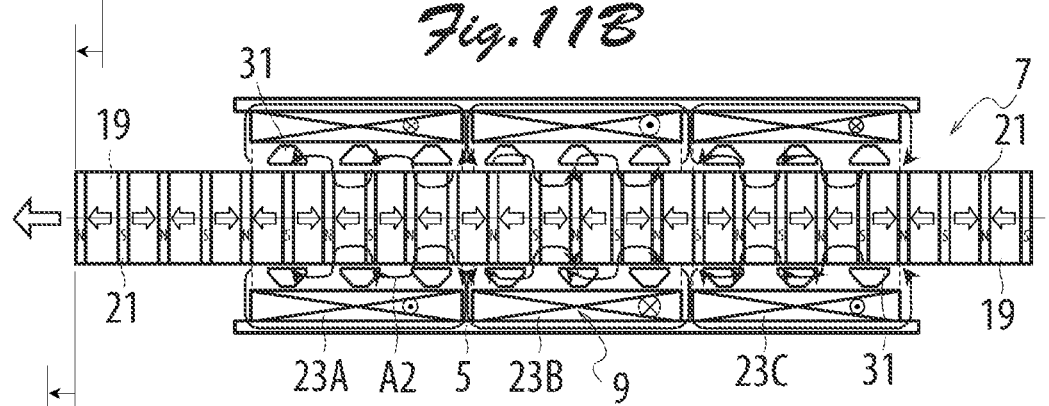
Figure 11C:
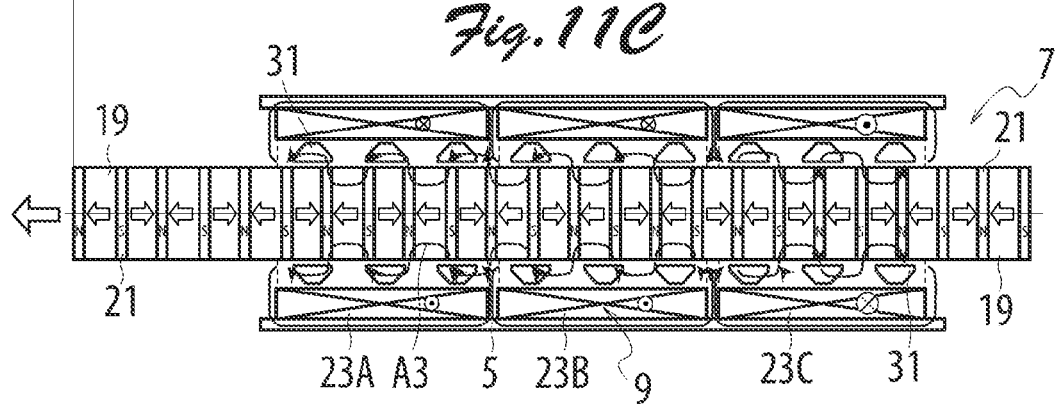

Next, the principle based on which reciprocal linear motion of the mover 7 of the linear motor 1 according to the embodiment with respect to the stator 9 is caused will be described. FIG. 10 shows waveforms of respective phases (U phase, V phase, and W phase) of the winding portions 23A to 23C. FIGS. 11A to 11C show the positional relationship between the mover 7 and the stator 9 at three points (A), (B), and (C) indicated in FIG. 10. In FIGS. 11A to 11C, in order to facilitate understanding, cross sections are not hatched. When the winding portions 23A to 23C are excited, magnetic flux (arrow A1) flows through the plurality of permanent magnets 19 and the plurality of magnetic pole pieces 31 as shown in FIG. 11A. This allows the magnetic flux and the permanent magnets 19 to be attracted to each other to move the mover 7 leftward as viewed facing the drawing sheet by $(1/3)\cdot 2\tau p$ as shown in FIG. 11B. Then, magnetic flux (arrow A2) generated in the state of FIG. 11B and the permanent magnets 19 are attracted to each other to move the mover 7 further leftward as viewed facing the drawing sheet by $(1/3)\cdot 2\tau p$ as shown in FIG. 11C. Then, magnetic flux (arrow A3) generated in the state of FIG. 11C and the permanent magnets 19 are attracted to each other to move the mover 7 further leftward as viewed facing the drawing sheet by $(1/3)\cdot 2\tau p$. Such a series of operations causes reciprocal linear motion of the mover 7 with respect to the stator 9.

In the linear motor 1 according to the embodiment, magnetic flux flows through two of the permanent magnets 19 magnetized in the same direction and located in the permanent magnet array 13 with one permanent magnet 19 interposed between the two permanent magnets 19, and also flows through one of the magnetic pole pieces 31 facing the one permanent magnet 19 interposed between the two permanent magnets 19 and magnetized in a direction different from the direction of magnetization of the two permanent magnets 19. This promotes attraction of the permanent magnets 19 toward the magnetic pole pieces 31, allowing enhancement of thrust of the mover 7.

(Second Embodiment)

Figure 12:
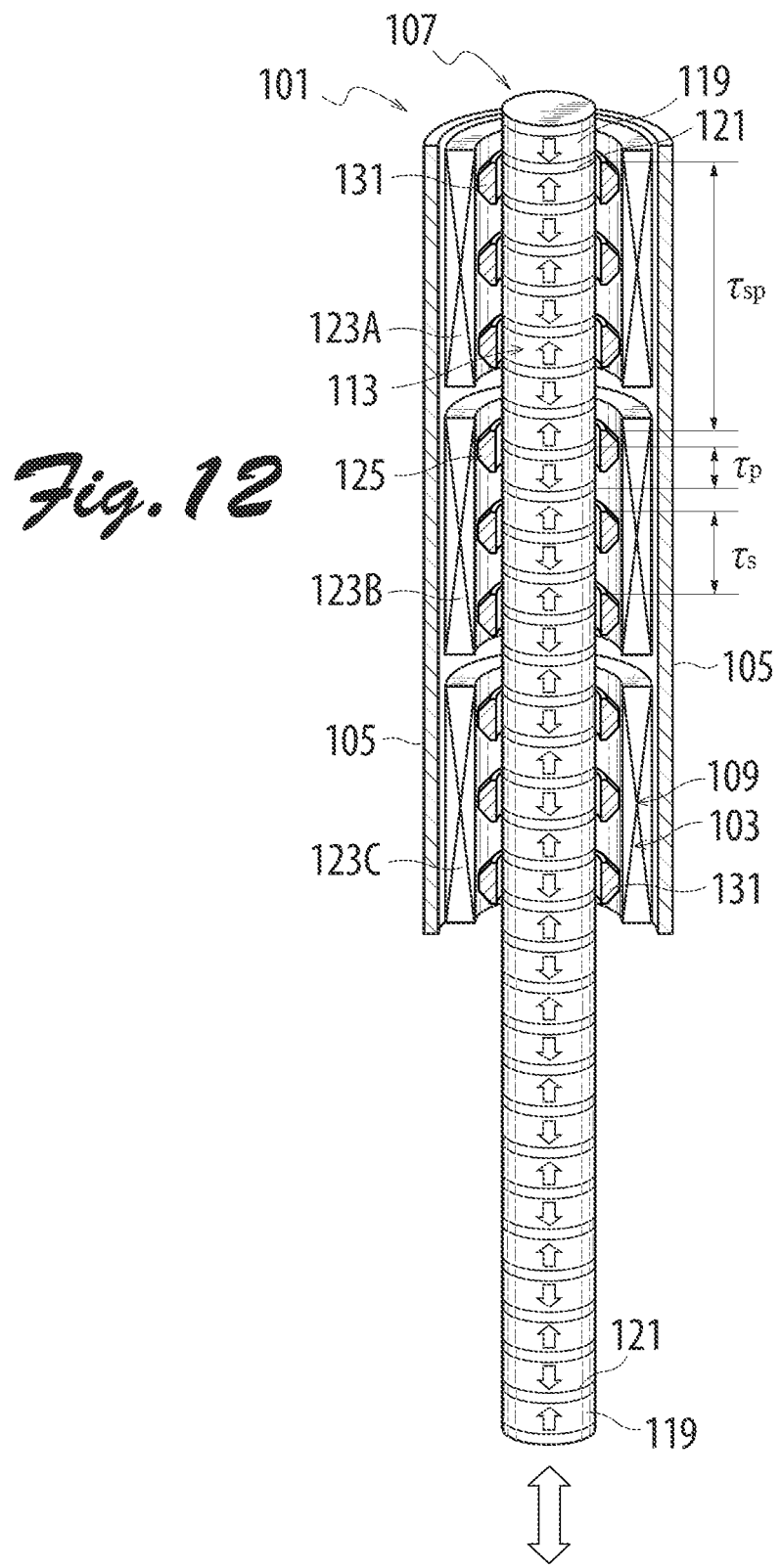
FIG. 12 is a partial perspective view showing an electric machine according to a second embodiment of the present invention applied to a linear motor, shown partially in cross section.

FIG. 12 is a partial perspective view showing an electric machine according to a second embodiment of the present invention applied to a linear motor, shown partially in cross section. In FIG. 12, in order to facilitate understanding, an insulating resin with which a plurality of magnetic pole pieces and winding portions are molded is not shown. A linear motor 101 according to the embodiment has the same configuration as that of the linear motor 1 according to the first embodiment except for the relational expression among the pitch τp of a plurality of permanent magnets 119, the pitch is of a plurality of magnetic pole pieces 131, and the interphase pitch τsp of the plurality of magnetic pole pieces 131. Therefore, component parts configured in the same way as those of the linear motor 1 according to the first embodiment are denoted by reference numerals obtained by adding 100 to the reference numerals affixed to their counterparts of the linear motor 1 according to the first embodiment to omit description thereof. Also in the linear motor 101 according to the embodiment, the pitch τp of the plurality of permanent magnets 119 and the pitch is of the plurality of magnetic pole pieces 131 located in a space inside one of three winding portions 123A to 123C are determined such that magnetic flux flows through two of the permanent magnets 119 magnetized in the same direction and located in the permanent magnet array 113 with one permanent magnet 119 interposed between the two permanent magnets 119, and also flows through one of the magnetic pole pieces 131 facing the one permanent magnet 119 interposed between the two permanent magnets 119 and magnetized in a direction different from the direction of magnetization of the two permanent magnets 119. In the linear motor 101 according to the embodiment, the pitch τp of the plurality of permanent magnets 119, the pitch is of the plurality of magnetic pole pieces 131 located in the space inside one of the plurality of winding portions 123A to 123C, and the interphase pitch τsp of the plurality of magnetic pole pieces 131 meet the formulas: $\tau s = 2\tau p$ and $\tau sp = 2\tau p(m \pm 1/n)$. For the linear motor 101 according to the embodiment, m=3, n=3, and $(m \pm 1/n) = (m + 1/n)$. Then, for the linear motor according to the embodiment, substituting such values into the formulas derives $\tau s = 2\tau p$ and $\tau sp = 2\tau p(3 + 1/3)$, that is, $\tau s = 2\tau p$ and $\tau sp = 20/3\tau p$.

(Third Embodiment)

Figure 13:
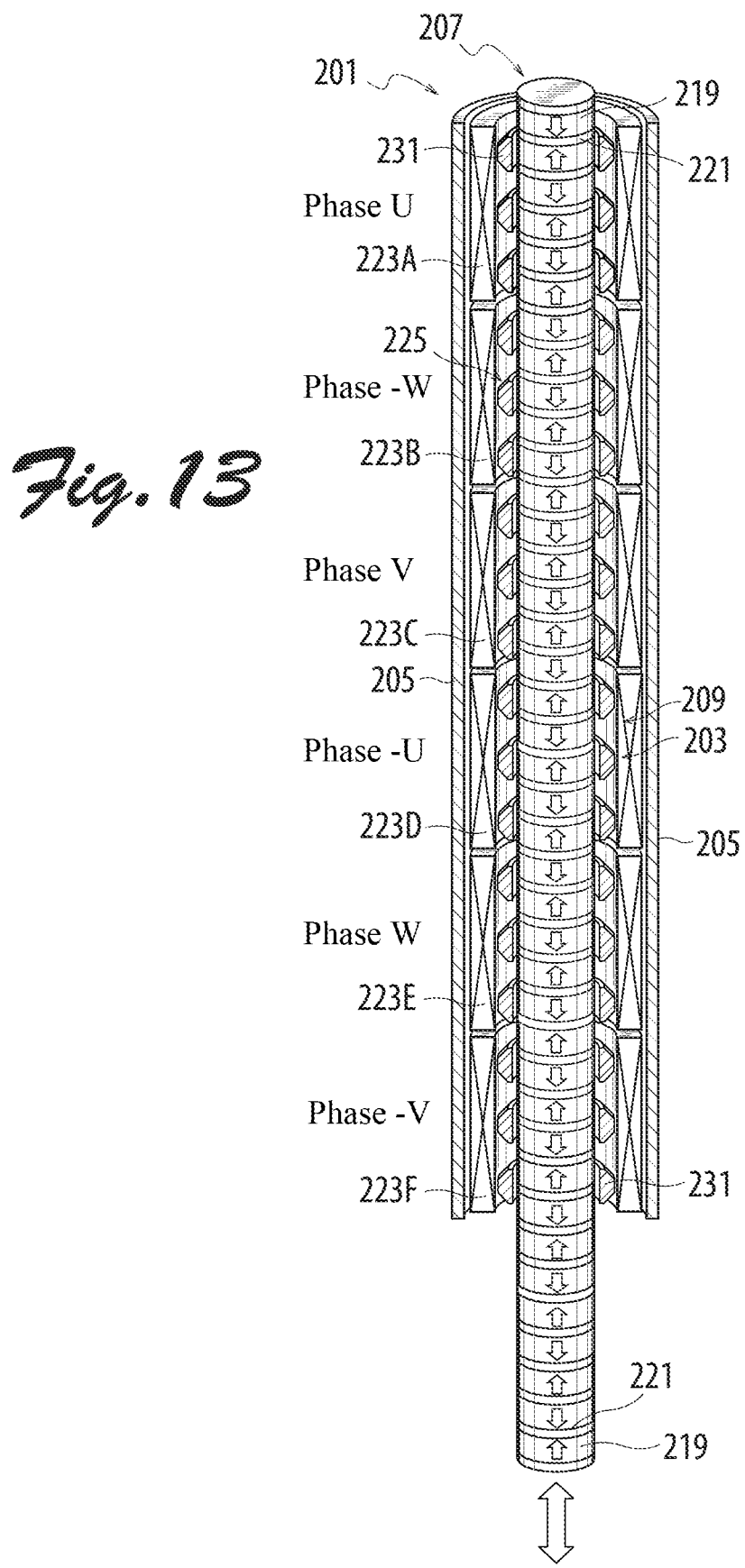
FIG. 13 is a partial perspective view showing an electric machine according to a third embodiment of the present invention applied to a linear motor, shown partially in cross section.

FIG. 13 is a partial perspective view showing an electric machine according to a third embodiment of the present invention applied to a linear motor, shown partially in cross section. A linear motor 201 according to the embodiment has the same configuration as that of the linear motor 1 according to the first embodiment except for the number of phases of winding portions 223A to 223F. Therefore, component parts configured in the same way as those of the linear motor 1 according to the first embodiment are denoted by reference numerals obtained by adding 200 to the reference numerals affixed to their counterparts of the linear motor 1 according to the first embodiment to omit description thereof. Excitation currents corresponding to six phases with a phase difference of 60°) $((360/n)°$ in terms of electrical angle are supplied to the winding portions 223A to 223F of the linear motor 201 according to the embodiment. As a result, currents for U phase, −W phase, V phase, −U phase, W phase, and −V phase are supplied to the winding portions 223A to 223F, respectively.

(Fourth Embodiment)

Figure 14:
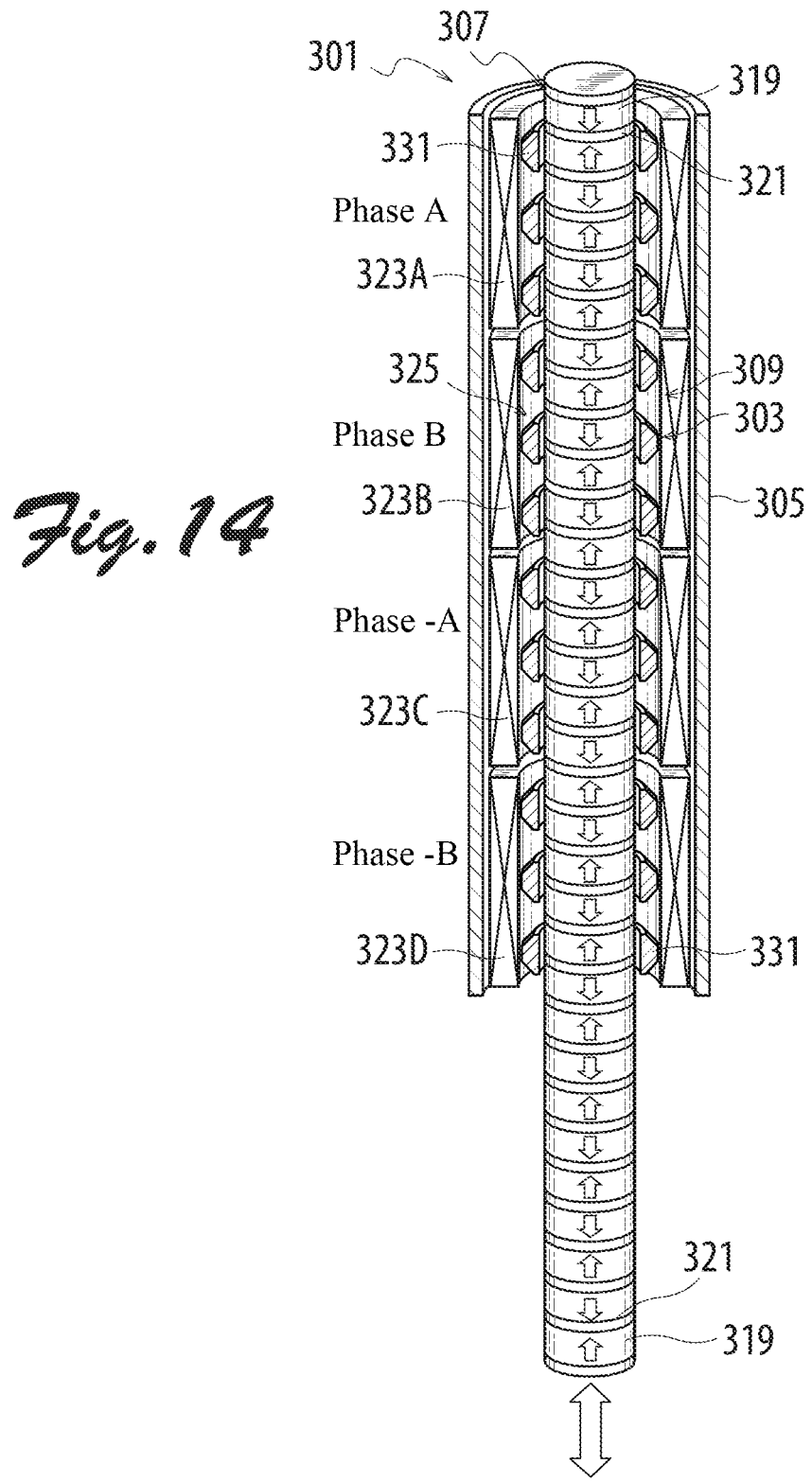
FIG. 14 is a partial perspective view showing an electric machine according to a fourth embodiment of the present invention applied to a linear motor, shown partially in cross section.

FIG. 14 is a partial perspective view showing an electric machine according to a fourth embodiment of the present invention applied to a linear motor, shown partially in cross section. A linear motor 301 according to the embodiment has the same configuration as that of the linear motor 1 according to the first embodiment except for the number of phases of winding portions 323A to 323D. Therefore, component parts configured in the same way as those of the linear motor 1 according to the first embodiment are denoted by reference numerals obtained by adding 300 to the reference numerals affixed to their counterparts of the linear motor 1 according to the first embodiment to omit description thereof. Excitation currents corresponding to four phases with a phase difference of 90°) $((360/n)°$ in terms of electrical angle are supplied to the winding portions 323A to 323D of the linear motor 301 according to the embodiment. As a result, currents for A phase, B phase, −A phase, and −B phase are supplied to the winding portions 323A to 323D, respectively.

(Fifth Embodiment)

Figure 15:
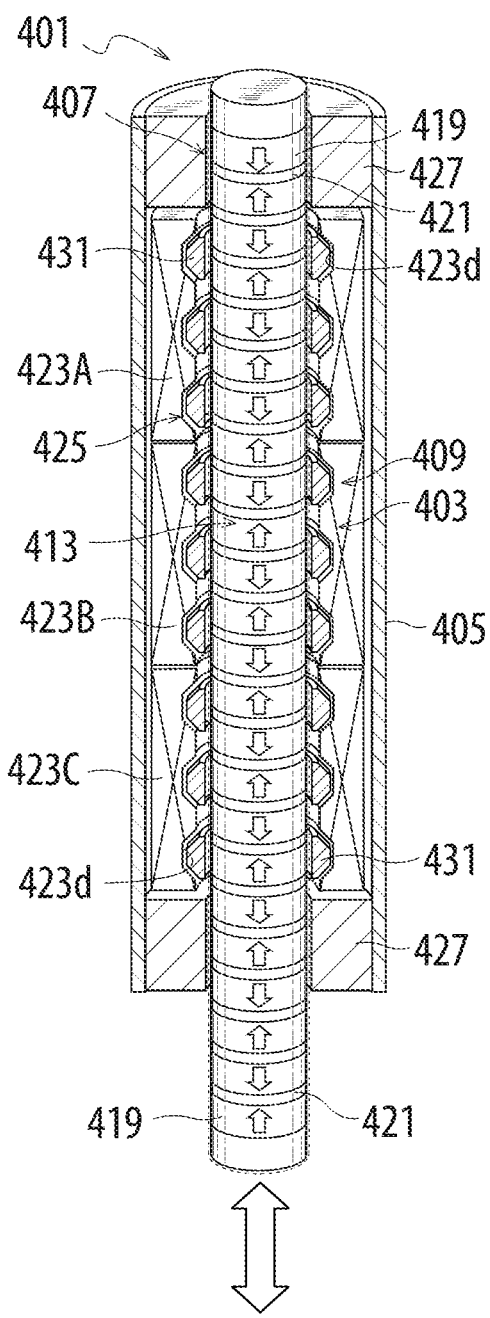
FIG. 15 is a partial perspective view showing an electric machine according to a fifth embodiment of the present invention applied to a linear motor, shown partially in cross section.
Figure 16:
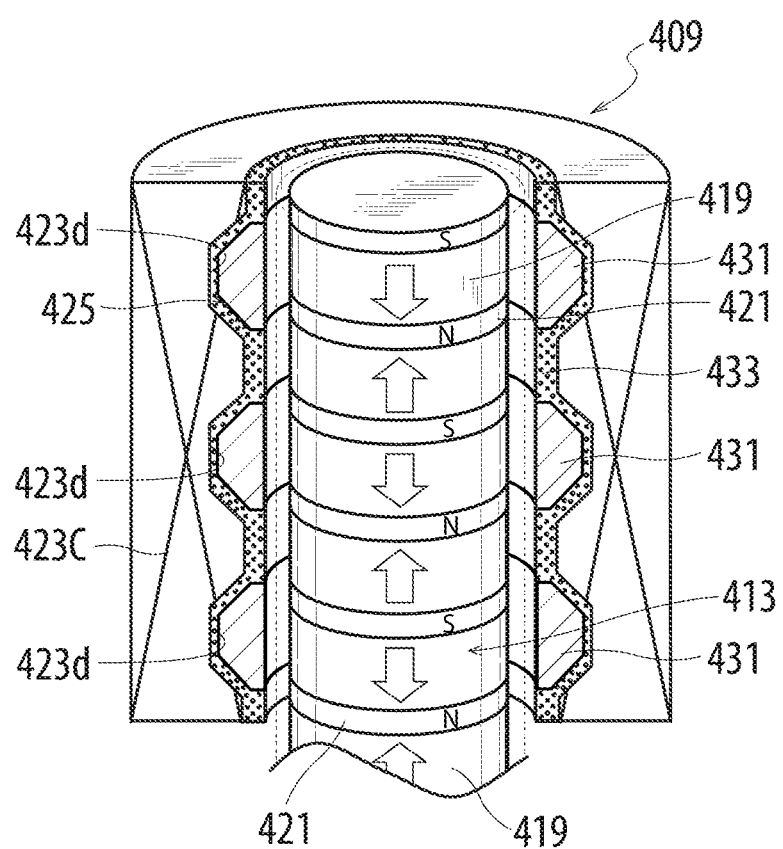
FIG. 16 is a partial enlarged view of FIG. 15.

FIG. 15 is a partial perspective view showing an electric machine according to a fifth embodiment of the present invention applied to a linear motor, shown partially in cross section. FIG. 16 is a partial enlarged view of FIG. 15. A linear motor 401 according to the embodiment has the same configuration as that of the linear motor 1 according to the first embodiment except for the structure of winding portions 423A to 423C, a magnetic pole piece array 425, and a pair of end brackets 427. Therefore, component parts configured in the same way as those of the linear motor 1 according to the first embodiment are denoted by reference numerals obtained by adding 400 to the reference numerals affixed to their counterparts of the linear motor 1 according to the first embodiment to omit description thereof. The winding portions 423A to 423C of the linear motor 401 according to the embodiment are formed with a plurality of recessed portions 423d opening toward a plurality of magnetic pole pieces 431. The plurality of magnetic pole pieces 431 are partially inserted into the plurality of recessed portions 423d, respectively. In FIG. 15, an insulating resin 433 (FIG. 16) is not shown. In addition, the pair of end brackets 427 of the linear motor 401 according to the embodiment function as friction bearings to directly support a mover 407.

With the linear motor 401 according to the embodiment, the volume of the linear motor 401 can be reduced by an amount by which the plurality of magnetic pole pieces 431 are partially inserted into the plurality of recessed portions 423*d*, respectively.

(Sixth Embodiment)

Figure 17:
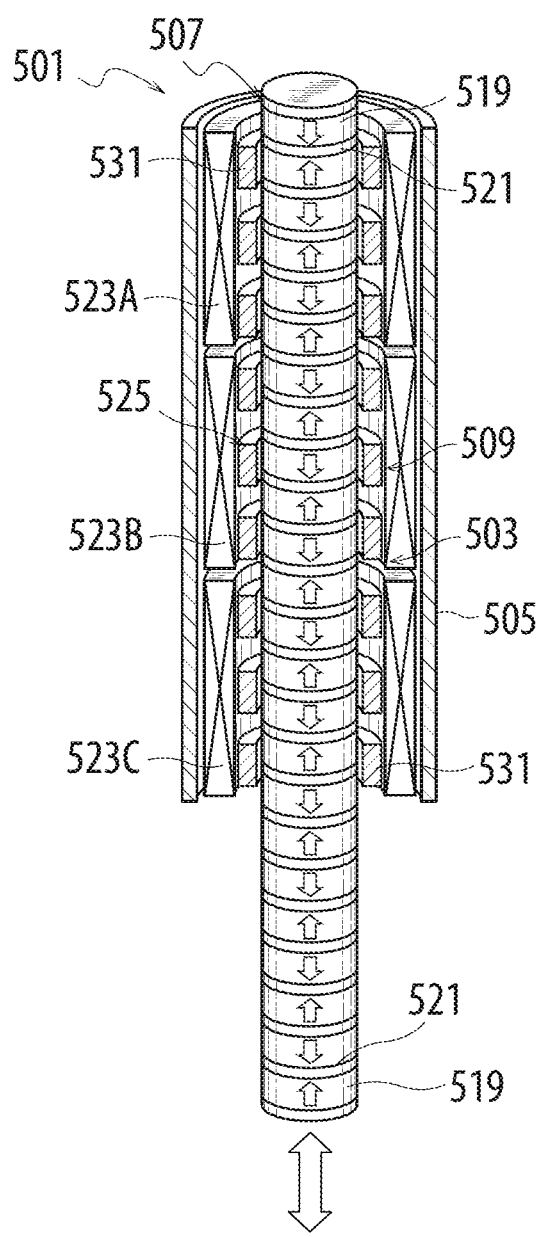
FIG. 17 is a partial perspective view showing an electric machine according to a sixth embodiment of the present invention applied to a linear motor, shown partially in cross section.
Figure 18:
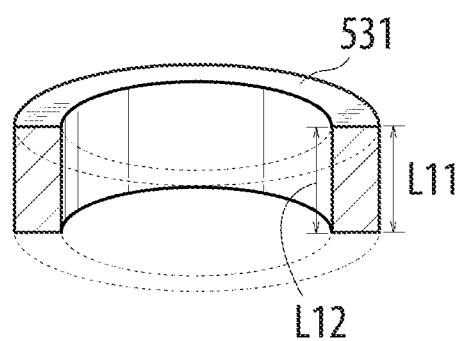
FIG. 18 is a cross-sectional view of a magnetic pole piece used in the linear motor shown in FIG. 17.

FIG. 17 is a partial perspective view showing an electric machine according to a sixth embodiment of the present invention applied to a linear motor, shown partially in cross section. FIG. 18 is a cross-sectional view of a magnetic pole piece 531 for use in a linear motor 501 according to the embodiment. A linear motor 501 according to the embodiment has the same configuration as that of the linear motor 1 according to the first embodiment except for the structure of a plurality of magnetic pole pieces 531. Therefore, component parts configured in the same way as those of the linear motor 1 according to the first embodiment are denoted by reference numerals obtained by adding 500 to the reference numerals affixed to their counterparts of the linear motor 1 according to the first embodiment to omit description thereof. The plurality of magnetic pole pieces 531 of the linear motor 501 according to the embodiment has a rectangular cross-sectional surface. That is, as shown in FIG. 18, the length L11, in the axial direction, of a surface of each of the magnetic pole pieces 531 facing winding portions 523A to 523C is equal to the length L12, in the axial direction, of a surface of each of the magnetic pole pieces 531 facing permanent magnets 519. Each of the magnetic pole pieces 531 may be an integrally cast product, formed by stacking a plurality of magnetic steel sheets in the axial direction, or formed by winding a belt-like magnetic steel sheet.

With the linear motor 501 according to the embodiment, the shape of the magnetic pole pieces 531 can be simplified to reduce the manufacturing cost.

(Seventh Embodiment)

Figure 19:
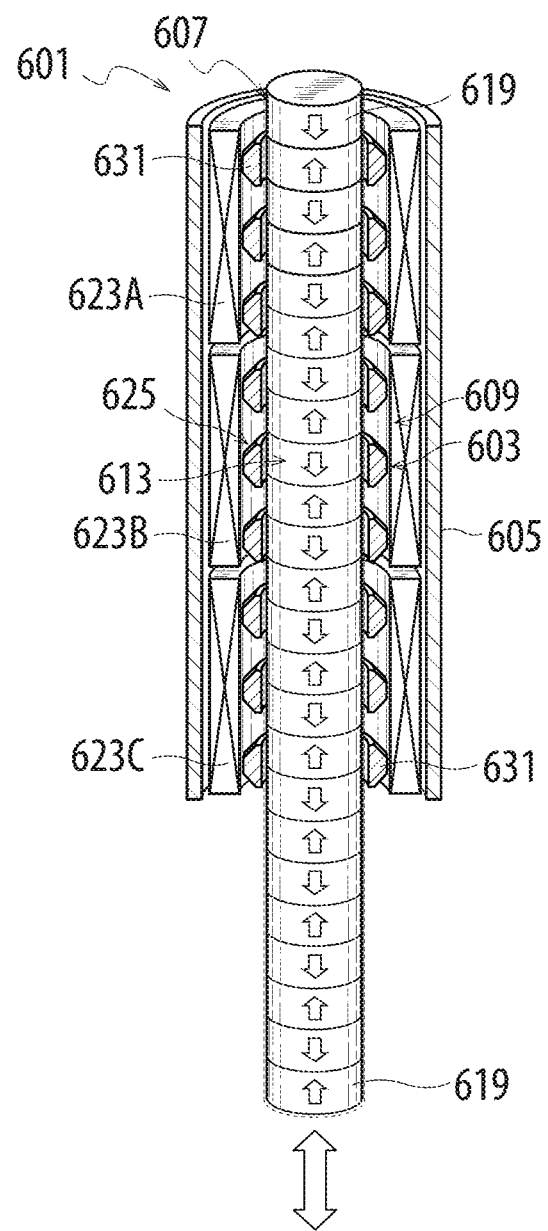
FIG. 19 is a partial perspective view showing an electric machine according to a seventh embodiment of the present invention applied to a linear motor, shown partially in cross section.

FIG. 19 is a partial perspective view showing an electric machine according to a seventh embodiment of the present invention applied to a linear motor, shown partially in cross section. A linear motor 601 according to the embodiment has the same configuration as that of the linear motor 1 according to the first embodiment except for the structure of a permanent magnet array 613. Therefore, component parts configured in the same way as those of the linear motor 1 according to the first embodiment are denoted by reference numerals obtained by adding 600 to the reference numerals affixed to their counterparts of the linear motor 1 according to the first embodiment to omit description thereof. The permanent magnet array 613 of the linear motor 601 according to the embodiment is structured such that a plurality of permanent magnets 619 are directly joined to each other. That is, the permanent magnet array 613 of the linear motor 601 according to the embodiment has no magnetic yokes.

With the linear motor 601 according to the embodiment, the amount of the permanent magnets 619 can be increased to further enhance thrust of a mover 607.

(Eighth Embodiment)

Figure 20:
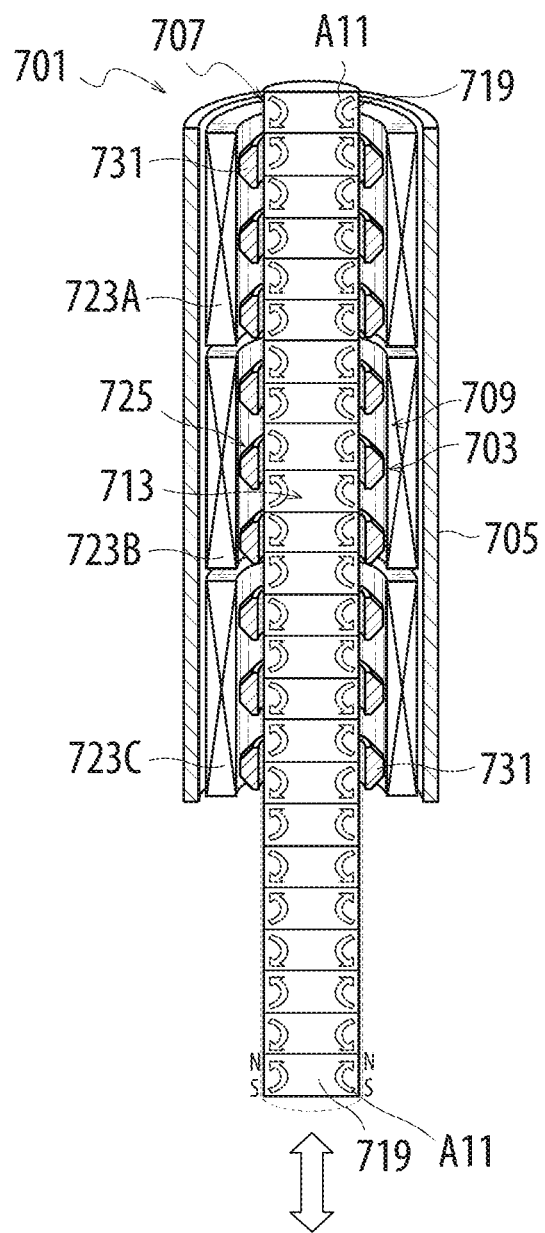
FIG. 20 is a partial perspective view showing an electric machine according to an eighth embodiment of the present invention applied to a linear motor, shown partially in cross section.

FIG. 20 is a partial perspective view showing an electric machine according to an eighth embodiment of the present invention applied to a linear motor, shown partially in cross section. A linear motor 701 according to the embodiment has the same configuration as that of the linear motor 1 according to the first embodiment except for the structure of a permanent magnet array 713. Therefore, component parts configured in the same way as those of the linear motor 1 according to the first embodiment are denoted by reference numerals obtained by adding 700 to the reference numerals affixed to their counterparts of the linear motor 1 according to the first embodiment to omit description thereof. A plurality of permanent magnets 719 of the permanent magnet array 713 of the linear motor 701 according to the embodiment are magnetized such that a curved internal magnetic path (arrow A11) is formed inside each of the plurality of permanent magnets 719, each curved internal magnetic path running from one end to the other end of the outer peripheral surface of the permanent magnet 719 in the extending direction of the permanent magnet array 713. In addition, the permanent magnet array 713 of the linear motor 701 according to the embodiment is structured such that the plurality of permanent magnets 719 are directly joined to each other. That is, the permanent magnet array 713 of the linear motor 701 according to the embodiment also has no magnetic yokes.

The linear motor 701 according to the embodiment provides a long internal magnetic path, preventing a reduction in magnetic force of the permanent magnets 719.

(Ninth Embodiment)

Figure 21:
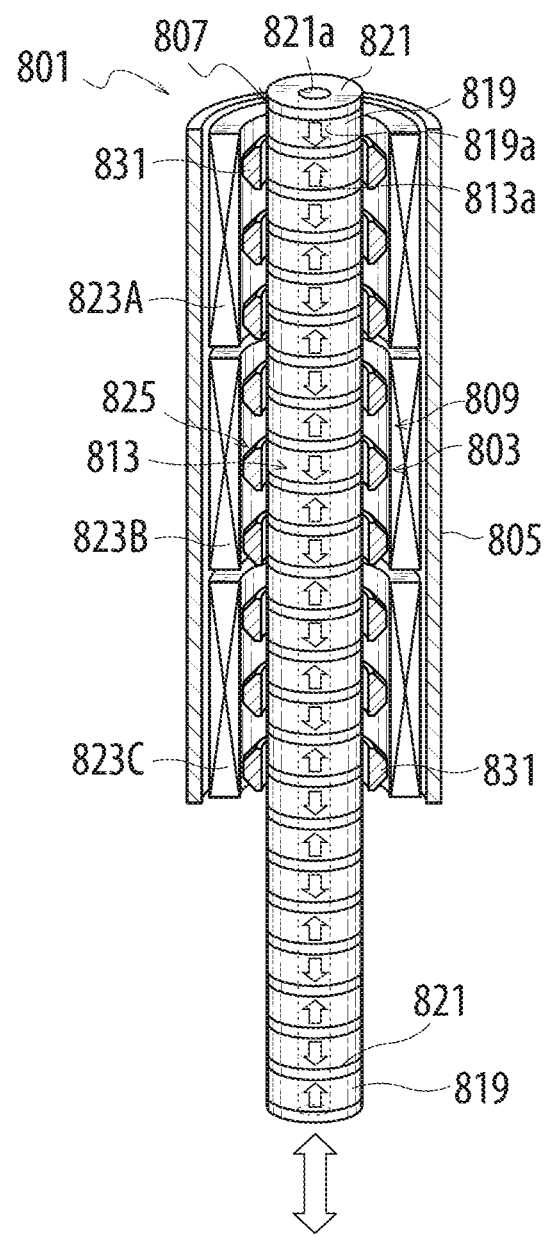
FIG. 21 is a partial perspective view showing an electric machine according to a ninth embodiment of the present invention applied to a linear motor, shown partially in cross section.

FIG. 21 is a partial perspective view showing an electric machine according to a ninth embodiment of the present invention applied to a linear motor, shown partially in cross section. A linear motor 801 according to the embodiment has the same configuration as that of the linear motor 1 according to the first embodiment except for the structure of a permanent magnet array 813. Therefore, component parts configured in the same way as those of the linear motor 1 according to the first embodiment are denoted by reference numerals obtained by adding 800 to the reference numerals affixed to their counterparts of the linear motor 1 according to the first embodiment to omit description thereof. A plurality of permanent magnets 819 included in the permanent magnet array 813 of the linear motor 801 according to the embodiment each have a cylindrical shape having a hollow portion 819*a* extending in the axial direction. In addition, magnetic yokes 821 each have a through hole 821*a* in communication with the hollow portions 819*a* of the permanent magnets 819. Therefore, a passage 813*a* extending in the axial direction is formed in the permanent magnet array 813.

With the linear motor 801 according to the embodiment, the amount of the permanent magnets 819 and the magnetic yokes 821 can be reduced without significantly reducing thrust of a mover 807. In addition, the hollow portions 819*a* of the permanent magnets 819 and the through holes 821*a* of the magnetic yokes 821 can form the passage 813*a* inside the permanent magnet array 813. Therefore, the passage 813*a* can be utilized as air piping for suctioning a chip if the linear motor 801 is used as a chip mounter.

(Tenth Embodiment)

Figure 22:
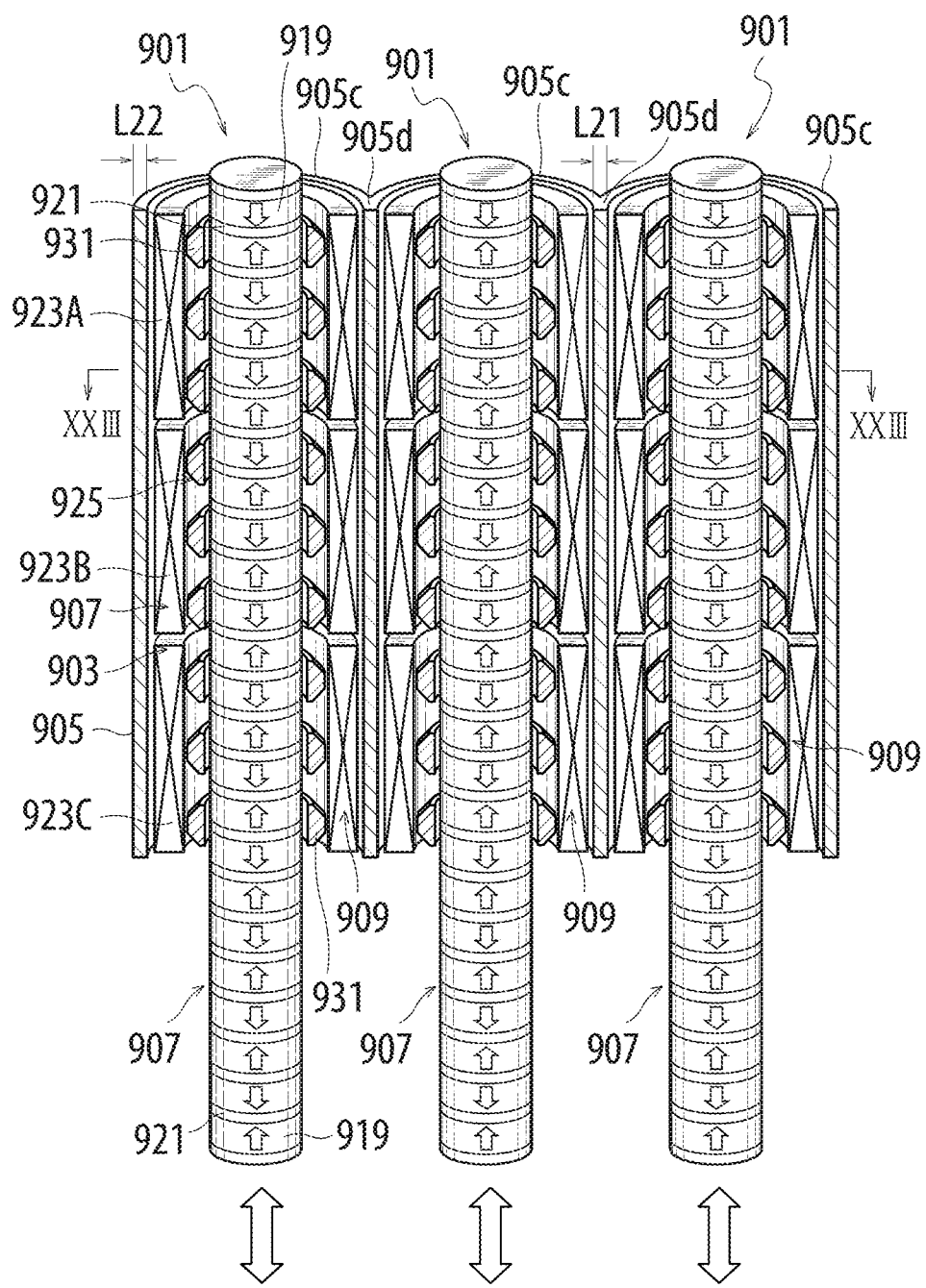
FIG. 22 is a partial perspective view showing a composite electric machine according to a tenth embodiment of the present invention applied to a composite linear motor, shown partially in cross section.
Figure 23:
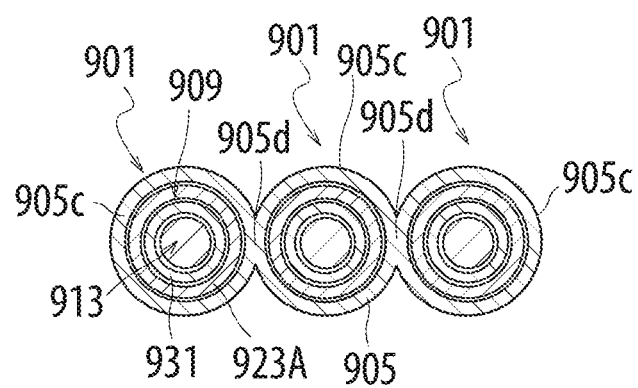
FIG. 23 is a cross-sectional view taken along the line XXIII-XXIII of FIG. 22.

FIG. 22 is a partial perspective view showing a composite electric machine according to a tenth embodiment of the present invention applied to a composite linear motor, shown partially in cross section. FIG. 23 is a cross-sectional view taken along the line XXIII-XXIII of FIG. 22. A composite linear motor according to the embodiment includes three linear motors 901 arranged side by side. Each of the linear motors 901 has the same configuration as that of the linear motor 1 according to the first embodiment except for the structure of a back yoke 905. Therefore, component parts configured in the same way as those of the linear motor 1 according to the first embodiment are denoted by reference numerals obtained by adding 900 to the reference numerals affixed to their counterparts of the linear motor 1 according to the first embodiment to omit description thereof. In the composite linear motor according to the embodiment, the back yokes of the three linear motors 901 are integrated to form an outer covering (back yoke 905). The back yoke 905 includes cylindrical portions 905*c* that surround linear motor bodies 903 of the three linear motors 901, and coupling portions 905*d* that couple two adjacent cylindrical portions 905*c*. The thickness L21 of each of the coupling portions 905d is smaller than twice the thickness L22 of each of the cylindrical portions 905c.

With the composite linear motor according to the embodiment, the three linear motors 901 can be bundled by the single, integrated back yoke 905.

(Eleventh Embodiment)

Figure 24:
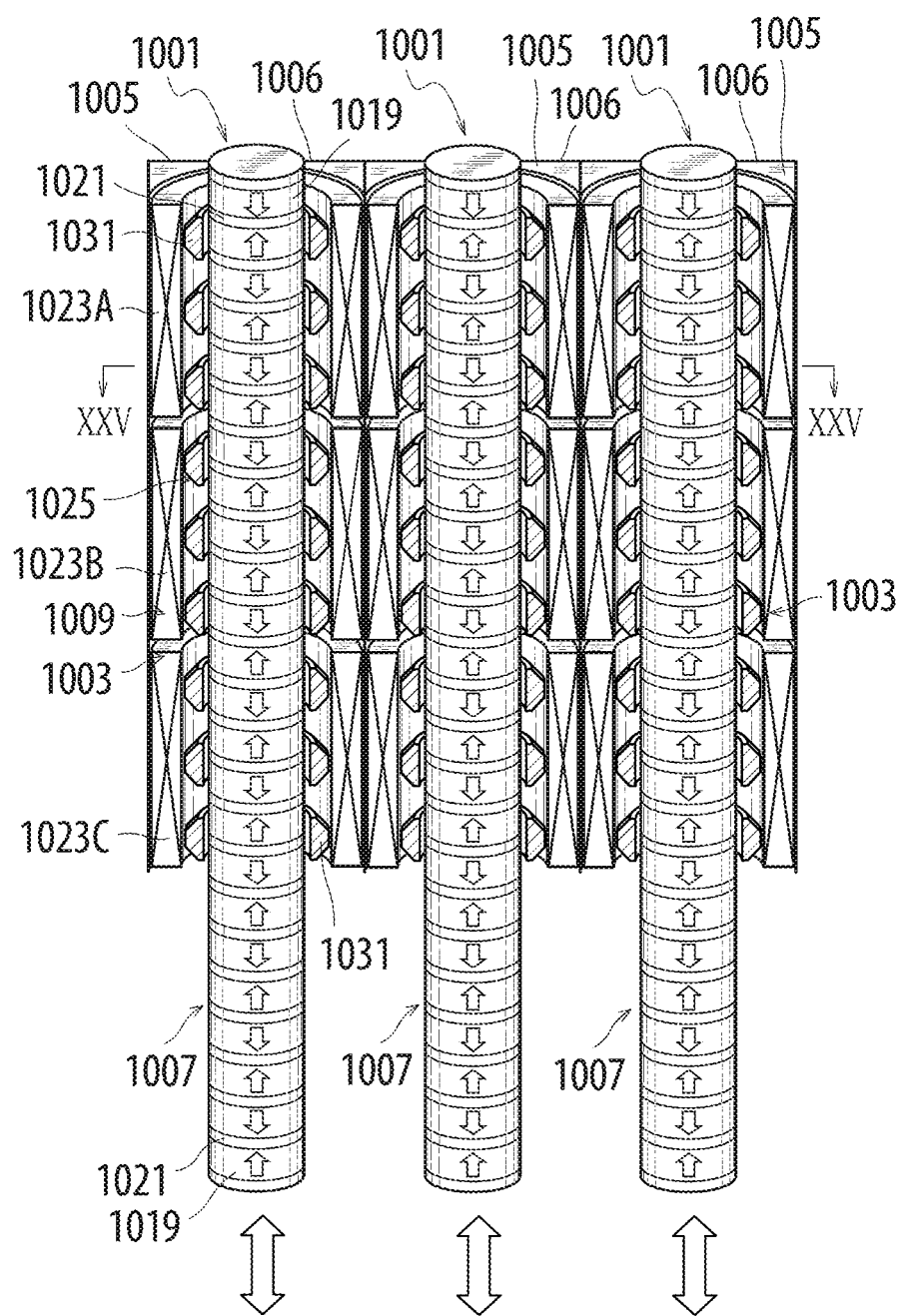
FIG. 24 is a partial perspective view showing a composite electric machine according to an eleventh embodiment of the present invention applied to a composite linear motor, shown partially in cross section.
Figure 25:
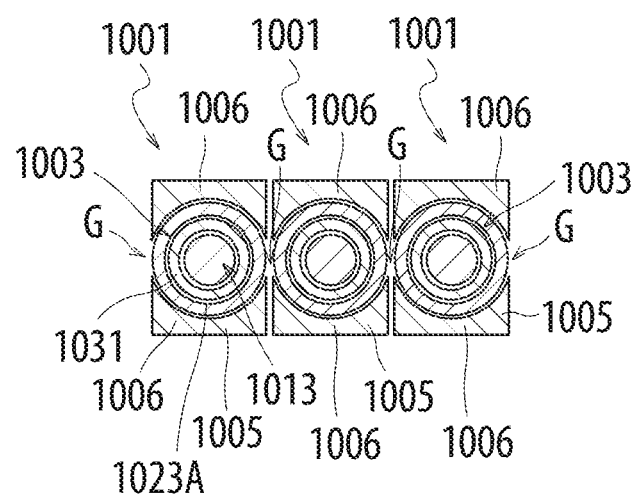
FIG. 25 is a cross-sectional view taken along the line XXV-XXV of FIG. 24.

FIG. 24 is a partial perspective view showing a composite electric machine according to an eleventh embodiment of the present invention applied to a composite linear motor, shown partially in cross section. FIG. 25 is a cross-sectional view taken along the line XXV-XXV of FIG. 24. A composite linear motor according to the embodiment includes three linear motors 1001 arranged side by side. Each of the linear motors 1001 has the same configuration as that of the linear motor 1 according to the first embodiment except for the structure of a back yoke 1005. Therefore, component parts configured in the same way as those of the linear motor 1 according to the first embodiment are denoted by reference numerals obtained by adding 1000 to the reference numerals affixed to their counterparts of the linear motor 1 according to the first embodiment to omit description thereof. In the composite linear motor according to the embodiment, the back yokes 1005 of the three linear motors 1001 are shaped such that no back yoke is provided between two adjacent linear motors 1001. Specifically, the back yokes 1005 each include two divided back yoke members 1006 disposed to interpose a linear motor assembly 1003 therebetween. Two gaps G are provided between the two divided back yoke members 1006, and the gaps G are located between the two adjacent linear motors 1001. The linear motor 1001 formed as an assembly of the two divided back yoke members 1006 and the linear motor assembly 1003 has a rectangular cross-sectional shape. The two adjacent linear motors 1001 are slightly spaced apart from each other with a gap formed therebetween.

With the composite linear motor according to the embodiment, the length of the composite linear motor in the arrangement direction of the three linear motors 1001 can be reduced.

(Twelfth Embodiment)

Figure 26:
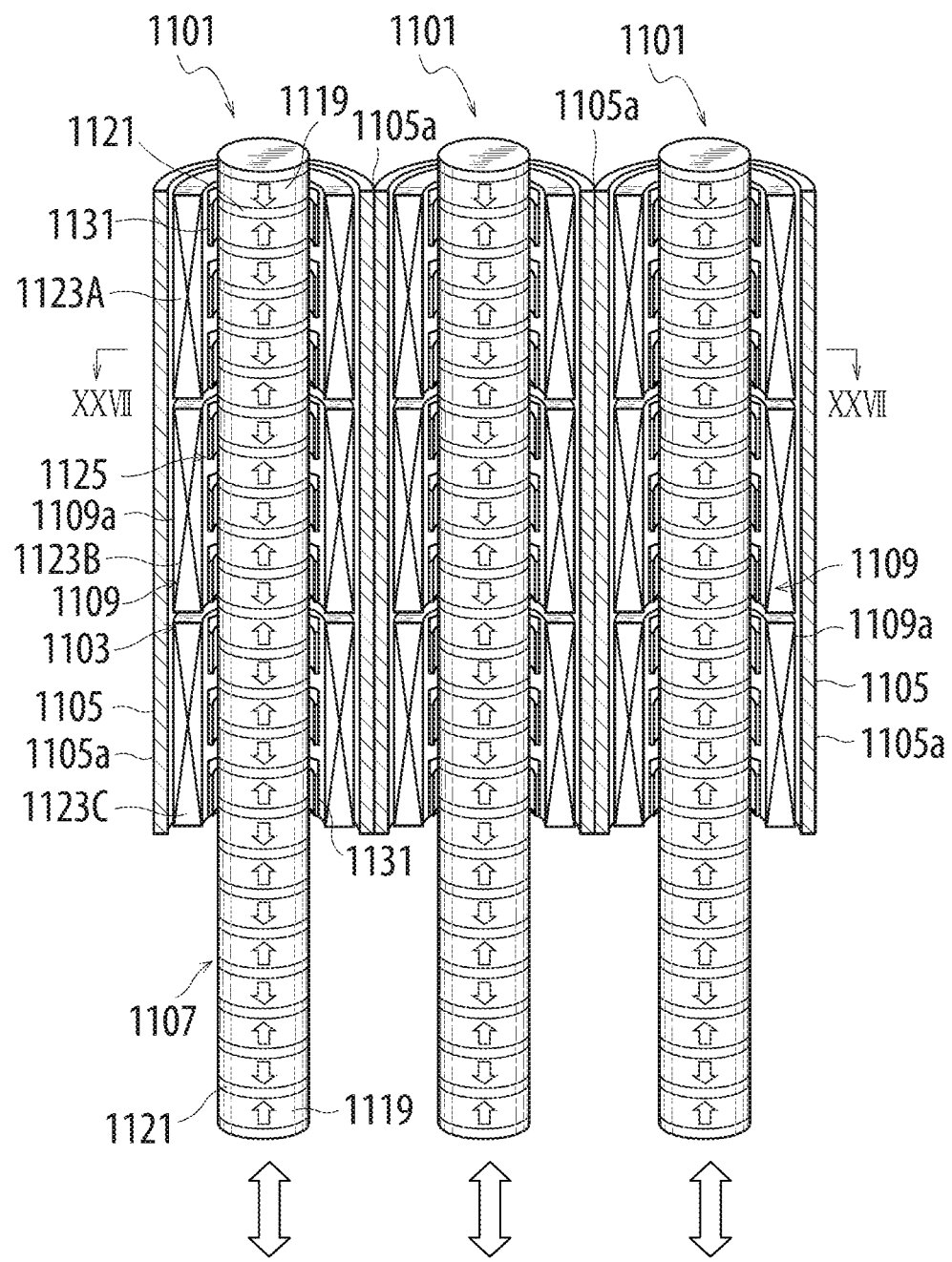
FIG. 26 is a partial perspective view showing a composite electric machine according to a twelfth embodiment of the present invention applied to a composite linear motor, shown partially in cross section.
Figure 27:
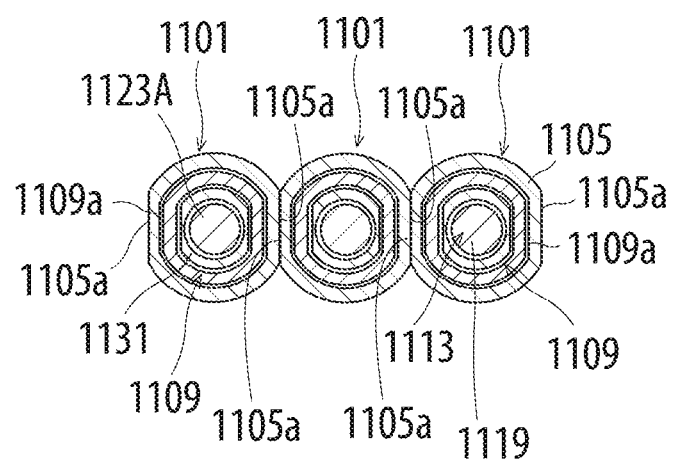
FIG. 27 is a cross-sectional view taken along the line XXVII-XXVII of FIG. 26.

FIG. 26 is a partial perspective view showing a composite electric machine according to a twelfth embodiment of the present invention applied to a composite linear motor, shown partially in cross section. FIG. 27 is a cross-sectional view taken along the line XXVII-XXVII of FIG. 26. A composite linear motor according to the embodiment includes three linear motors 1101 arranged side by side. Each of the linear motors 1101 has the same configuration as that of the linear motor 1 according to the first embodiment except for the shape of a stator 1109 and a back yoke 1105. Therefore, component parts configured in the same way as those of the linear motor 1 according to the first embodiment are denoted by reference numerals obtained by adding 1100 to the reference numerals affixed to their counterparts of the linear motor 1 according to the first embodiment to omit description thereof. The stators 1109 of the linear motors 1101 each include a flat surface portion 1109a provided in the arrangement direction of the three linear motors 1101. The back yokes 1105 of the linear motors 1101 also each include a flat surface portion 1105a provided in the arrangement direction of the three linear motors 1101. This allows surface contact between the outer surfaces of the back yokes 1105 of two adjacent linear motors 1101.

Also with the composite linear motor according to the embodiment, the length of the composite linear motor in the arrangement direction of the three linear motors 1101 can be reduced.

(Thirteenth Embodiment)

Figure 28:
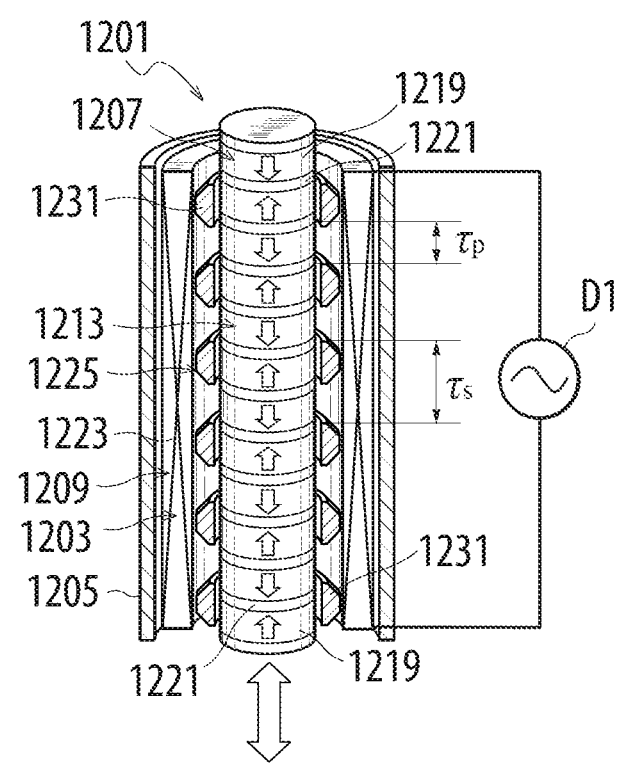
FIG. 28 is a partial perspective view showing an electric machine according to a thirteenth embodiment of the present invention applied to a linear vibration actuator, shown partially in cross section.

FIG. 28 is a partial perspective view showing an electric machine according to a thirteenth embodiment of the present invention applied to a linear vibration actuator, shown partially in cross section. As shown in FIG. 28, a linear vibration actuator 1201 according to the embodiment includes a linear motor assembly 1203 and a back yoke 1205 attached to the linear motor assembly 1203. The linear motor assembly 1203 includes a mover 1207 and a stator 1209. In the linear vibration actuator 1201 according to the embodiment, an excitation current corresponding to a single phase is supplied to a winding portion 1223, and six magnetic pole pieces 1231 are located in a space inside the one winding portion 1223. Otherwise, the linear vibration actuator 1201 according to the embodiment basically has the same configuration as that of the linear motor 1 according to the first embodiment shown in FIG. 1. Therefore, component parts configured in the same way as those of the linear motor 1 according to the first embodiment are denoted by reference numerals obtained by adding 1200 to the reference numerals affixed to their counterparts of the linear motor 1 according to the first embodiment to omit description thereof. In the linear vibration actuator 1201 according to the embodiment, when an alternating current is supplied from an alternating-current power source D1, reciprocal vibration of the mover 1207 with respect to the stator 1209 is caused. The pitch $\tau p$ of a plurality of permanent magnets 1219 and the pitch is of a plurality of magnetic pole pieces 1231 may meet the formula $\tau s = 2\tau p \pm x (0 \leq x \leq 2\tau p/(n \cdot m))$. In the formula, m is the number (in the embodiment, six) of the magnetic pole pieces 1231 located in the space inside the one winding portion 1223, and n is the number (in the embodiment, one) of phases of the winding portion 1223. For the linear vibration actuator 1201 according to the embodiment, m=6 and n=1. Then, for the linear vibration actuator 1201 according to the embodiment, substituting such values into the formula derives $\tau s = 2\tau p \pm x (0 \leq x \leq 2\tau p/6)$.

Figure 29:
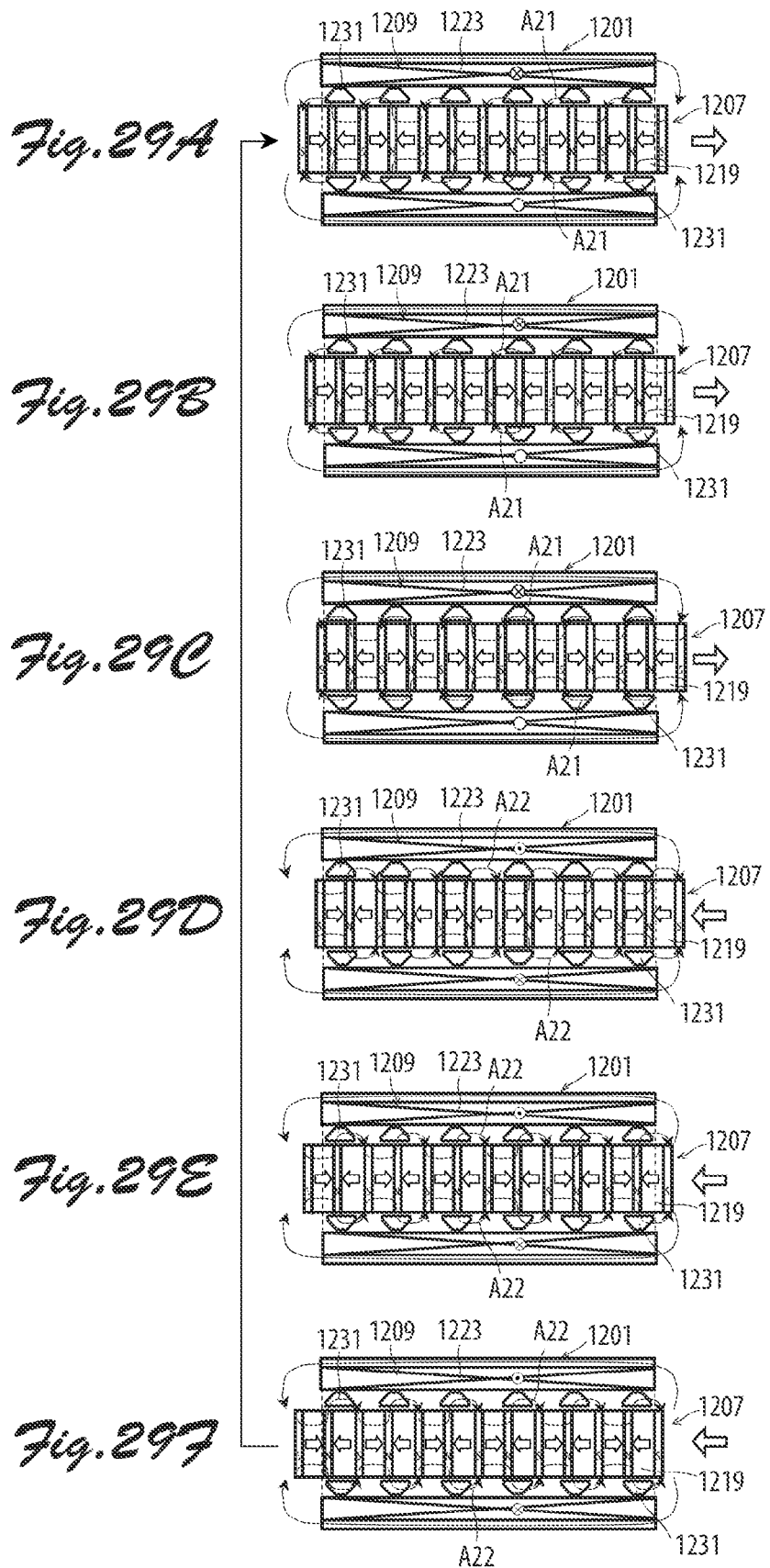
FIGS. 29A to 29F show the positional relationship between a mover and a stator used to illustrate the principle based on which reciprocal vibration of the linear vibration actuator shown in FIG. 28 is caused.

Next, the principle based on which reciprocal vibration of the mover 1207 of the linear vibration actuator 1201 according to the embodiment with respect to the stator 1209 is caused will be described. FIG. 29A to 29F show the positional relationship between the mover 1207 and the stator 1209. In FIGS. 29A to 29F, in order to facilitate understanding, cross sections are not hatched. When the winding portion 1223 is excited, magnetic flux (arrow A21) flows through the plurality of permanent magnets 1219 and the plurality of magnetic pole pieces 1231 as shown in FIG. 29A to 29C. This allows the magnetic flux and the permanent magnets 1219 to be attracted to each other to move the mover 1207 rightward as viewed facing the drawing sheet. When the direction of a current supplied to the winding portion 1223 is reversed, magnetic flux (arrow A22) in the direction opposite to the arrow A21 discussed earlier flows through the plurality of permanent magnets 1219 and the plurality of magnetic pole pieces 1231 as shown in FIG. 29D to 29F. This allows the magnetic flux and the permanent magnets 1219 to be attracted to each other to move the mover 1207 leftward as viewed facing the drawing sheet. Such a series of operations causes reciprocal vibration of the mover 1207 with respect to the stator 1209.

(Fourteenth Embodiment)

Figure 30:
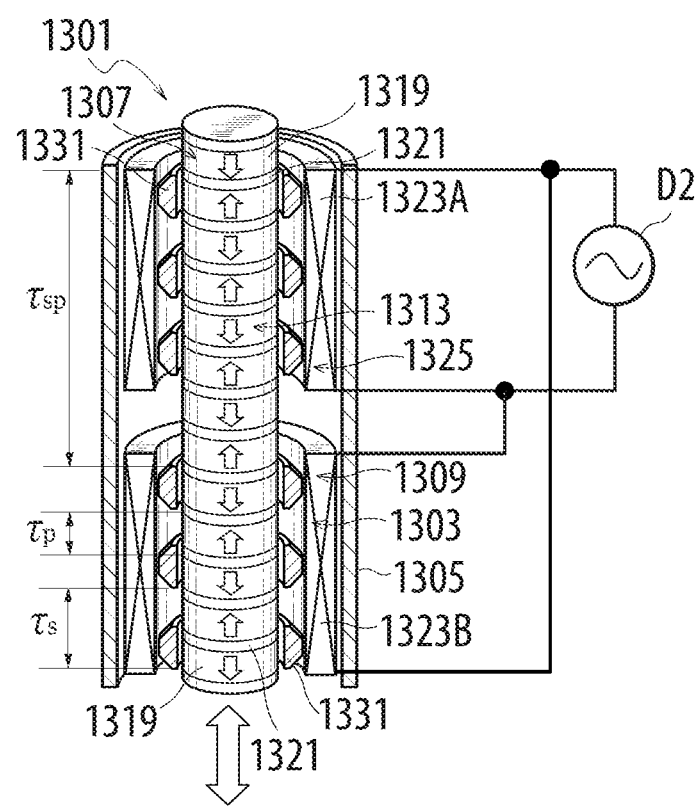
FIG. 30 is a partial perspective view showing an electric machine according to a fourteenth embodiment of the present invention applied to a linear vibration actuator, shown partially in cross section.

FIG. 30 is a partial perspective view showing an electric machine according to a fourteenth embodiment of the present invention applied to a linear vibration actuator, shown partially in cross section. A linear vibration actuator 1301 according to the embodiment basically has the same configuration as that of the linear motor 1 according to the first embodiment shown in FIG. 1 except for the structure of a stator 1309. Therefore, component parts configured in the same way as those of the linear motor 1 according to the first embodiment are denoted by reference numerals obtained by adding 1300 to the reference numerals affixed to their counterparts of the linear motor 1 according to the first embodiment to omit description thereof. The stator 1309 of the linear vibration actuator 1301 according to the embodiment includes two winding portions 1323A and 1323B. Excitation currents with a phase difference of 180°) ((360/n)° in terms of electrical angle are supplied to the winding portions 1323A and 1323B. That is, alternating currents that are opposite in phase to each other are supplied to the winding portions 1323A and 1323B. As a result, currents for A phase and −A phase are supplied to the winding portions 1323A and 1323B, respectively. In addition, three magnetic pole pieces 1331 are located in a space inside one of the winding portions 1323A and 1323B. In the linear vibration actuator 1301 according to the embodiment, when an alternating current is supplied from an alternating-current power source D2, the winding portions 1323A and 1323B generate alternating magnetic flux to provide thrust to cause a mover 1307 to repeat reciprocal linear motion between permanent magnets 1309 and the magnetic pole pieces 1331. This causes the mover 1307 to repeat reciprocal linear motion with respect to the stator 1309 to generate vibration. The pitch τp of the plurality of permanent magnets 1319 and the pitch τs of the plurality of magnetic pole pieces 1331 located in the space inside one of the two winding portions 1323A and 1323B may meet the formula τs=2τp±x (0≤x≤2τp/(n·m)). In the formula, m is the number (in the embodiment, three) of the magnetic pole pieces 1331 located in the space inside one of the winding portions 1323A and 1323B, and n is the number (in the embodiment, one) of phases of the winding portions for a constant pitch area of the magnetic pole pieces 1331. For the linear vibration actuator 1301 according to the embodiment, m=3, n=1, and τs=2τp±x (0≤x≤2τp/3). The three magnetic pole pieces 1331 located in one winding portion 1323A, of the two winding portions 1323 and 1323B, and the three magnetic pole pieces 1331 located in the other winding portion 1323B are disposed apart from each other by an electrical angle of 180°. The interphase pitch τsp of the plurality of magnetic pole pieces 1331 and the pitch τp of the plurality of permanent magnets 1319 have a relation τsp=(2·Na−1)·τp. In the formula, Na is a natural number.

(Fifteenth Embodiment)

Figure 31:
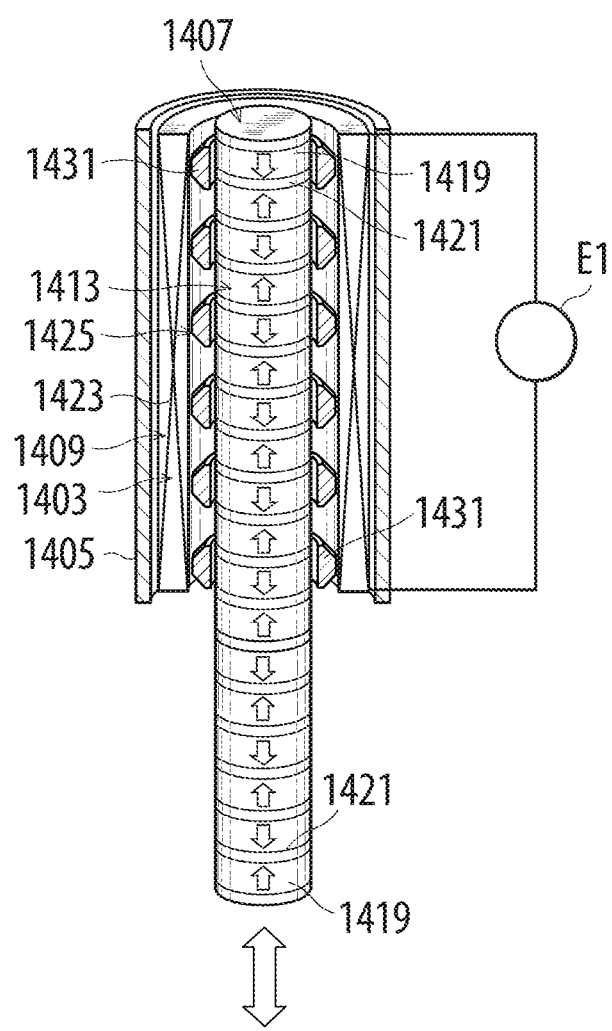
FIG. 31 is a partial perspective view showing an electric machine according to a fifteenth embodiment of the present invention applied to a linear vibration generator, shown partially in cross section.

FIG. 31 is a partial perspective view showing an electric machine according to a fifteenth embodiment of the present invention applied to a linear vibration generator, shown partially in cross section. A linear vibration generator 1401 according to the embodiment basically has the same configuration as that of the linear vibration actuator 1201 according to the thirteenth embodiment shown in FIG. 28. Therefore, component parts configured in the same way as those of the linear vibration actuator 1201 according to the thirteenth embodiment are denoted by reference numerals obtained by adding 100 to the reference numerals affixed to their counterparts of the linear vibration actuator 1201 according to the thirteenth embodiment (reference numerals obtained by adding 1400 to the reference numerals affixed to their counterparts of the linear motor 1 according to the first embodiment) to omit description thereof. In the linear vibration generator 1401 according to the embodiment, when reciprocal linear motion of a mover 1407 is caused by an external force, a magnetic path is formed by magnetic flux emitted from a plurality of permanent magnets 1419 of a permanent magnet array 1413 to supply electric power to an electric machine E1.

Figure 32A:
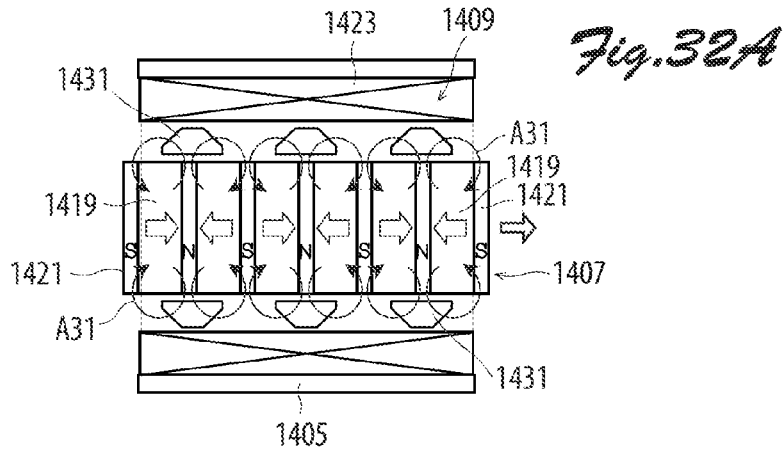
FIGS. 32A to 32C show the positional relationship between a mover and a stator used to illustrate the principle based on which reciprocal linear motion of the linear vibration generator shown in FIG. 31 is caused.
Figure 32B:
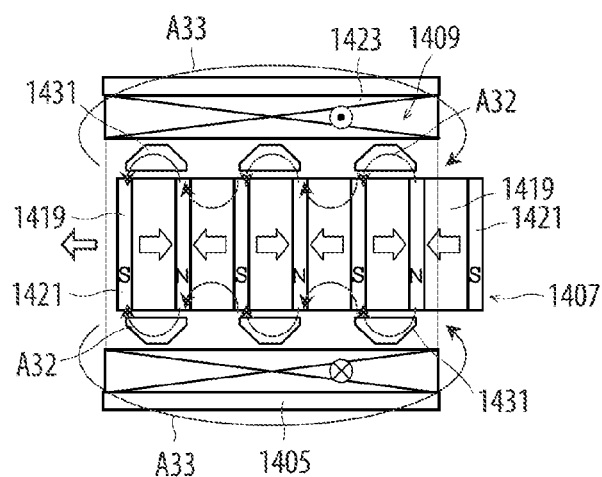
Figure 32C:
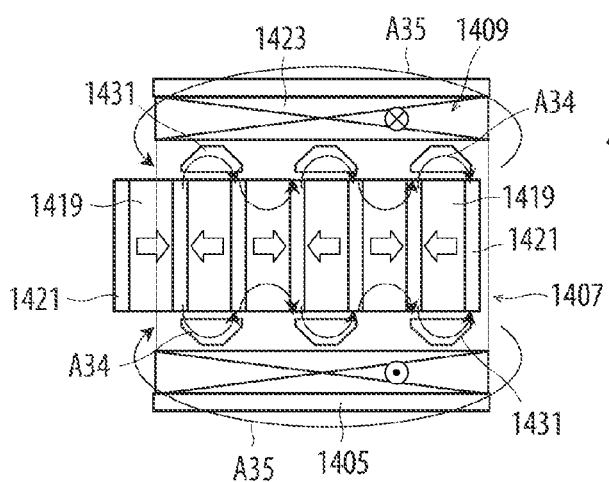

Next, the principle based on which the linear vibration generator 1401 according to the embodiment generates magnetic flux will be described. FIG. 32A shows the positional relationship between the mover 1407 and a stator 1409 at the initial position. FIG. 32B shows the positional relationship between the mover 1407 and the stator 1409 in a state in which the mover 1407 has been moved in one direction. FIG. 32C shows the positional relationship between the mover 1407 and the stator 1409 in a state in which the mover 1407 has been moved in the other direction which is opposite to the one direction discussed earlier. In FIGS. 32A and 32B, three magnetic pole pieces 1431 are located in a space inside a winding portion 1423. In FIGS. 32A and 32B, in order to facilitate understanding, cross sections are not hatched. At the initial position shown in FIG. 32A, magnetic flux emitted from the plurality of permanent magnets 1419 circulates through the magnetic pole pieces 1431 in proximity (arrow A31). As shown in FIG. 32B, when the mover 1407 is moved in one direction by an external force from the initial position shown in FIG. 32A, magnetic flux emitted from the plurality of permanent magnets 1419 flows in the other direction (in the direction opposite to the one direction in which the mover 1407 is moved) between the permanent magnets 1419 and the magnetic pole pieces 1431 (arrow A32) to form magnetic flux around the winding portion 1423 (arrow A33). Consequently, an alternating voltage is induced in the winding portion 1423. Next, as shown in FIG. 32C, when the mover 1407 is moved in the other direction by an external force from the position shown in FIG. 32B, magnetic flux emitted from the plurality of permanent magnets 1419 flows in the one direction (in the direction opposite to the other direction in which the mover 1407 is moved) between the permanent magnets 1419 and the magnetic pole pieces 1431 (arrow A34) to form magnetic flux in the direction opposite to the direction shown in FIG. 32B around the winding portion 1423 (arrow A35). Consequently, an alternating voltage is induced in the winding portion 1423 to generate a current in the direction opposite to the direction shown in FIG. 32B.

(Sixteenth Embodiment)

Figure 33:
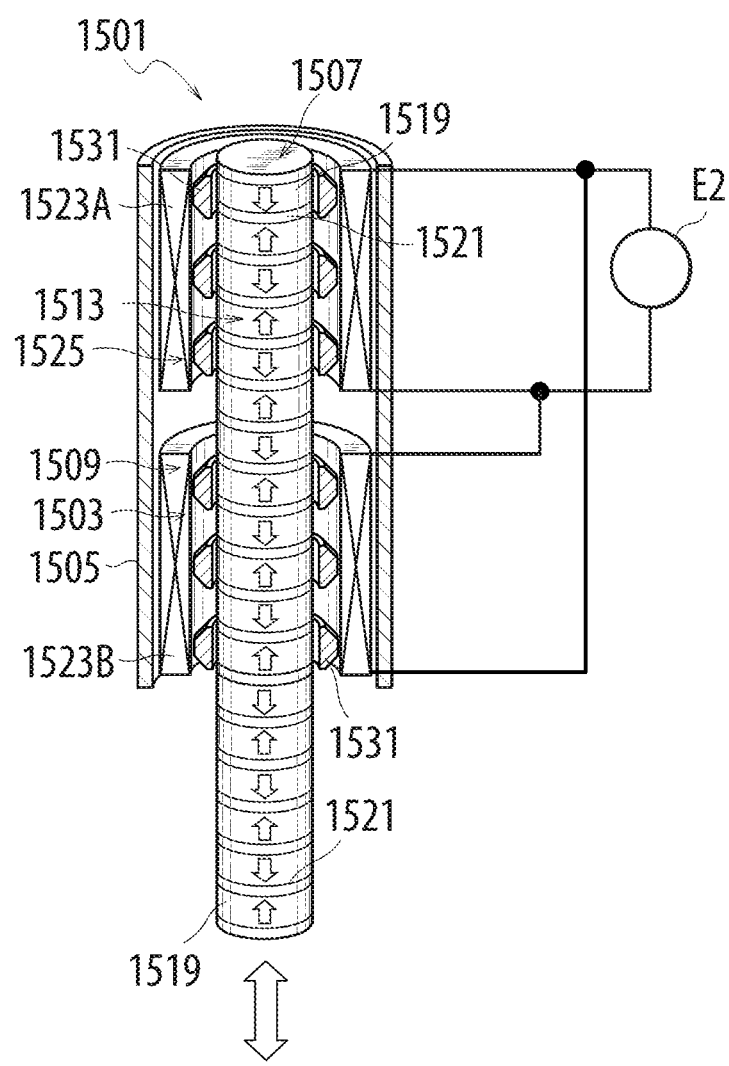
FIG. 33 is a partial perspective view showing an electric machine according to a sixteenth embodiment of the present invention applied to a linear vibration generator, shown partially in cross section.

FIG. 33 is a partial perspective view showing an electric machine according to a sixteenth embodiment of the present invention applied to a linear vibration generator, shown partially in cross section. A linear vibration generator 1501 according to the embodiment basically has the same configuration as that of the linear vibration actuator 1301 according to the fourteenth embodiment shown in FIG. 30. Therefore, component parts configured in the same way as those of the linear vibration actuator 1301 according to the fourteenth embodiment are denoted by reference numerals obtained by adding 100 to the reference numerals affixed to their counterparts of the linear vibration actuator 1301 according to the fourteenth embodiment (reference numerals obtained by adding 1500 to the reference numerals affixed to their counterparts of the linear motor 1 according to the first embodiment) to omit description thereof. In the linear vibration generator 1501 according to the embodiment, when reciprocal linear motion of a mover 1507 is caused by an external force, magnetic flux emitted from a plurality of permanent magnets 1519 of a permanent magnet array 1513 passes through winding portions to induce a voltage in the winding portions to supply electric power to an electric machine E2.

In the fifteenth and sixteenth embodiments described above, linear vibration generators with a single phase and two phases are described. However, it is a matter of course that the present invention can also be applied to linear vibration generators with three or more phases.

In the electric machines according to the first to sixteenth embodiments described above, back yokes are provided. However, back yokes may not be provided.

The electric machines according to the first to ninth and thirteenth to sixteenth embodiments described above have a circular cross section as the electric machines are viewed in a direction orthogonal to the axial direction. However, the electric machines may have a variety of cross-sectional shapes such as elliptical and rectangular shapes.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. An electric machine comprising:
   a stator;
   a mover capable of reciprocal linear motion in an axial line direction with respect to the stator,
   one of the stator and the mover including a permanent magnet array including a plurality of permanent magnets arranged such that magnetic poles having the same polarity directly face each other in the axial line direction,
   the plurality of permanent magnets in the permanent magnet array include two permanent magnets that are magnetized in the same direction of the axial line and one permanent magnet having a different polarity being interposed between the two permanent magnets;
   the other of the stator and the mover including one or more winding portions formed by winding a winding conductor in a coil and concentrically disposed with the permanent magnet array; and
   a magnetic pole piece array including a plurality of magnetic pole pieces which are disposed between the permanent magnet array and the one or more winding portions in immovable relation with the winding portions and are spaced along the permanent magnet array, characterized in that:
   a pitch of the plurality of permanent magnets and a pitch of the plurality of magnetic pole pieces are determined such that magnetic flux flows through two of the permanent magnets magnetized in the same direction of the axial line and located in the permanent magnet array with one permanent magnet interposed between the two permanent magnets, and also flows through one of the magnetic pole pieces facing the one permanent magnet interposed between the two permanent magnets and magnetized in a direction different from the direction of magnetization of the two permanent magnets.

2. The electric machine according to claim 1, wherein the plurality of magnetic pole pieces each have an annular shape extending in a circumferential direction of the permanent magnet array to surround the permanent magnet array.

3. The electric machine according to claim 1, wherein magnetic yokes are disposed on both sides of each of the plurality of permanent magnets, respectively.

4. The electric machine according to claim 3, wherein the plurality of permanent magnets each have a cylindrical shape having a hollow portion extending in an extending direction of the permanent magnet array, and the magnetic yokes each have a through hole in communication with the hollow portions.

5. The electric machine according to claim 3, wherein the permanent magnet array is housed inside a cylindrical member made of a non-magnetic material.

6. The electric machine according to claim 1, wherein the plurality of permanent magnets are directly joined to each other to form the permanent magnet array.

7. The electric machine according to claim 6, wherein the plurality of permanent magnets each have a cylindrical shape having a hollow portion extending in an extending direction of the permanent magnet array.

8. The electric machine according to claim 1, wherein the one or more winding portions generate the magnetic flux to provide thrust to cause the mover to repeat the reciprocal linear motion between the permanent magnets and the magnetic pole pieces.

9. The electric machine according to claim 1, wherein the magnetic flux is generated by magnetic flux emitted from the plurality of permanent magnets of the permanent magnet array when the reciprocal linear motion of the mover is caused by an external force.

10. The electric machine according to claim 1, wherein the winding portions corresponding to n phases are disposed along the permanent magnet array, n being an integer of 2 or more, and excitation currents with a phase difference of $(360/n)°$ are supplied to the n winding portions to cause the reciprocal linear motion of the mover.

11. The electric machine according to claim 10, wherein: one of the following pairs of formulas is met:

$$\tau s = 2\tau p(1+1/(n \cdot m)) \text{ and } \tau sp = 2\tau p(m+1/n); \text{ and}$$

$$\tau s = 2\tau p(1-1/(n \cdot m)) \text{ and } \tau sp = 2\tau p(m-1/n),$$

where:
$\tau p$ denotes the pitch of the plurality of permanent magnets;
$\tau s$ denotes the pitch of the plurality of magnetic pole pieces located in a space inside one of the n winding portions;
m denotes the number of the magnetic pole pieces located in the space inside the one of the n winding portions; and
$\tau sp$ denotes an interphase pitch between two of the magnetic pole pieces, wherein one of the two magnetic pole pieces is contained in the m magnetic pole pieces located in the space inside one of adjacent two of the n winding portions and is located in the X-th position as viewed from one end to the other end in an extending direction of the permanent magnet array, and the other of the two magnetic pole pieces is contained in the m magnetic pole pieces located in the space inside the other of adjacent two of the n winding portions and is located in the X-th position as viewed from one end to the other end in the extending direction of the permanent magnet array.

12. The electric machine according to claim 10, wherein: the following pair of formulas are met:

$$\tau s = 2\tau p \text{ and } \tau sp = 2\tau p(m \pm 1/n),$$

where:
$\tau p$ denotes the pitch of the plurality of permanent magnets;
$\tau s$ denotes the pitch of the plurality of magnetic pole pieces located in a space inside one of the n winding portions;
m denotes the number of the magnetic pole pieces located in the space inside the one of the n winding portions; and
$\tau sp$ denotes an interphase pitch between two of the magnetic pole pieces, wherein one of the two magnetic pole pieces is contained in the m magnetic pole pieces located in the space inside one of adjacent two of the n winding portions and is located in the X-th position as viewed from one end to the other end in an extending direction of the permanent magnet array, and the other of the two magnetic pole pieces is contained in the m magnetic pole pieces located in the space inside the other of adjacent two of the n winding portions and is located in the X-th position as viewed from one end to the other end in the extending direction of the permanent magnet array.

13. The electric machine according to claim 10, further comprising:
a back yoke provided outside the n winding portions to form a part of a magnetic circuit.

14. The electric machine according to claim 13, further comprising:
a bearing fixed at each of both ends of the back yoke in the extending direction of the permanent magnet array to support the mover such that the mover is capable of the reciprocal linear motion but is not rotatable in the circumferential direction.

15. The electric machine according to claim 1, wherein the plurality of magnetic pole pieces and the one or more winding portions are molded with an insulating resin.

16. The electric machine according to claim 1, wherein:
the one or more winding portions are each formed with a plurality of recessed portions opening toward the plurality of magnetic pole pieces; and
the plurality of magnetic pole pieces are partially inserted into the plurality of recessed portions, respectively.

17. The electric machine according to claim 1, wherein the length, in an extending direction of the permanent magnet array, of a surface of each of the plurality of magnetic pole pieces facing the one or more winding portions is shorter than the length, in the extending direction of the permanent magnet array, of a surface of each of the plurality of magnetic pole pieces facing the permanent magnets.

18. The electric machine according to claim 1, wherein the length, in an extending direction of the permanent magnet array, of a surface of each of the plurality of magnetic pole pieces facing the one or more winding portions is equal to the length, in the extending direction of the permanent magnet array, of a surface of each of the plurality of magnetic pole pieces facing the permanent magnets.

19. The electric machine according to claim 1, wherein each of the plurality of magnetic pole pieces is formed by stacking magnetic steel sheets in an extending direction of the permanent magnet array.

20. The electric machine according to claim 1, wherein each of the plurality of magnetic pole pieces is formed by winding a belt-like magnetic steel sheet in the circumferential direction.

21. The electric machine according to claim 1, wherein the plurality of permanent magnets are each magnetized such that a curved internal magnetic path is formed inside each of the plurality of permanent magnets, each curved internal magnetic path running from one end to the other end of an outer peripheral surface of the permanent magnet in an extending direction of the permanent magnet array.

22. The electric machine according to claim 1, wherein one winding portion is provided, and an alternating current is supplied to the one winding portion to cause the mover to reciprocally vibrate.

23. The electric machine according to claim 1, wherein two winding portions are disposed side by side in an extending direction of the mover, and alternating currents having opposite phases are supplied to the two winding portions to cause the mover to reciprocally vibrate.

24. The electric machine according to claim 1, wherein the permanent magnet array is configured to reciprocally move by means of an external force such that an alternating voltage is induced in each of the one or more winding portions.

25. The electric machine according to claim 1, wherein:
two winding portions are disposed side by side in an extending direction of the mover;
a plurality of magnetic pole pieces located in one of the winding portions and a plurality of magnetic pole pieces located in the other of the winding portions are disposed apart from each other by an electrical angle of 180°; and
the permanent magnet array is configured to reciprocally move by means of an external force such that an alternating voltage is induced in each of the two winding portions.

* * * * *